United States Patent
Ono

(10) Patent No.: US 6,193,332 B1
(45) Date of Patent: Feb. 27, 2001

(54) VEHICULAR BRAKE SYSTEM OPERATING DURING STOP

(75) Inventor: Takahiko Ono, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/187,107

(22) Filed: Nov. 5, 1998

(30) Foreign Application Priority Data

May 13, 1998 (JP) .................................. 10-130733

(51) Int. Cl.[7] ........................................ B60T 8/32
(52) U.S. Cl. ........................ 303/191; 188/DIG. 2
(58) Field of Search .................... 303/192, 191, 303/24.1; 188/DIG. 2

(56) References Cited

U.S. PATENT DOCUMENTS

| | | | |
|---|---|---|---|
| 3,645,352 | * 2/1972 | Stark et al. | 180/82 |
| 4,446,950 | * 5/1984 | Wise et al. | 192/3 TR |
| 4,838,617 | * 6/1989 | Deitchman et al. | 303/6.1 |
| 4,871,215 | * 10/1989 | Takayama | 303/100 |
| 4,949,820 | * 8/1990 | Fontaine et al. | 192/1.23 |
| 5,452,946 | * 9/1995 | Warner | 303/24.1 |
| 5,791,750 | * 8/1998 | Spiegelberg | 303/191 |
| 5,916,062 | * 6/1999 | Siepker | 477/194 |
| 5,979,619 | * 11/1999 | Rump | 188/353 |
| 5,984,429 | * 11/1999 | Nell et al. | 303/113.4 |

FOREIGN PATENT DOCUMENTS 63-106162 * 5/1988 (JP) .
8-48220    2/1996 (JP) .

* cited by examiner

Primary Examiner—Robert J. Oberleitner
Assistant Examiner—Bradley King
(74) Attorney, Agent, or Firm—Sughrue, Mion, Zinn, Macpeak & Seas, PLLC

(57) ABSTRACT

An in-stop brake system immediately operates an in-stop brake when a braking force, which is generated by a driver stepping on a brake pedal while a motor vehicle is in a stopped condition, exceeds a predetermined braking force, thereby providing necessary and sufficient in-stop braking force at any time required. The in-stop brake system includes an operation decision section for allowing the in-stop brake to be operated when the braking force generated by the stepping-on of the brake pedal becomes larger than a predetermined braking force under the conditions that the motor vehicle is in the stopped condition and that an accelerator pedal is in a released condition, the operation decision section being further operable to inhibit the operation of the in-stop brake when the accelerator pedal is stepped on. Also included in the in-stop brake system is a valve drive section for closing an opening and closing valve installed in a brake fluid passage between a master cylinder and a wheel cylinder when the operation decision section permits the operation of the in-stop brake and for opening the opening and closing valve when it inhibits the operation of the in-stop brake.

18 Claims, 21 Drawing Sheets

ONE EXAMPLE OF SET VALUE ADJUSTING SWITCHES

ANOTHER EXAMPLE OF SET VALUE ADJUSTING SWITCHES

FIG. 19A (BRAKE PEDAL IS IN RELEASED CONDITION.)

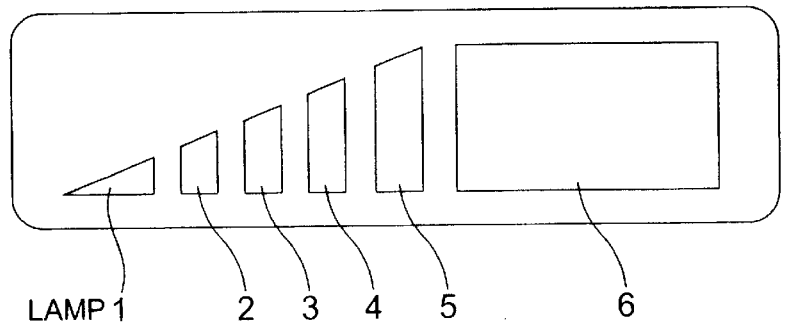

LAMP 1  2  3  4  5  6

FIG. 19B (BRAKE PEDAL IS STEPPED ON BY FORCE CORRESPONDING TO 50% OF BRAKING FORCE NEEDED FOR OPERATION OF IN-STOP BRAKE.)

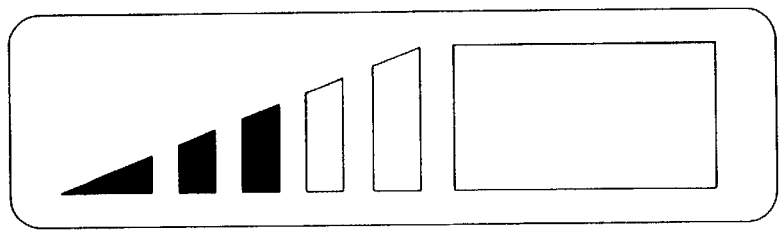

FIG. 19C (BRAKE PEDAL IS STEPPED ON BY FORCE CORRESPONDING TO 90% OF BRAKING FORCE NEEDED FOR OPERATION OF IN-STOP BRAKE.)

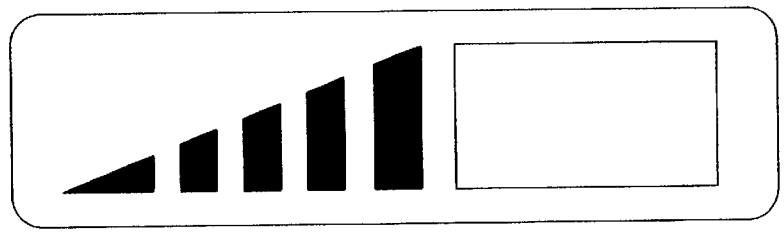

FIG. 19D (BRAKE PEDAL IS STEPPED ON BY FORCE CORRESPONDING TO 100% OF BRAKING FORCE NEEDED FOR OPERATION OF IN-STOP BRAKE. (IN-STOP BRAKING OPERATION).)

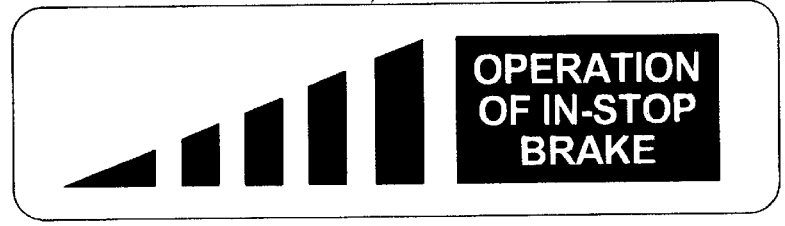

(THE NUMBER OF TRANSISTOR FOR ENERGIZING OPENING AND CLOSING VALVE IS ONE(PRIOR ART).)

(TRANSISTORS FOR ENERGIZING OPENING AND CLOSING VALVE ARE PLACED BOTH SIDES OF OPENING AND CLOSING VALVE.)

(IN-STOP BRAKE IS IN RELEASED CONDITION (VALVE IS IN OPEN CONDITION).)

FROM MASTER CYLINDER → TO WHEEL CYLINDER (IN-STOP BRAKE IS IN OPERATION (VALVE IS IN CLOSED CONDITION).)

VEHICULAR BRAKE SYSTEM OPERATING DURING STOP

BACKGROUND OF THE INVENTION

1. Field of the Invention

The present invention relates to a brake system for use in a motor vehicle, and more particularly to a brake control system capable of maintaining a braking force even when a brake pedal is released from being stepping-on during a stop.

2. Description of the Related Art

In recent years, in order to lighten the fatigue of a driver resulting from continuous stepping on a brake pedal during waiting for traffic light or running in traffic jam, there has been developed a brake system operating during a stop (which will be referred hereinafter to as an in-stop brake system) which automatically applies the brakes during a stop.

As exemplified by Japanese Unexamined Patent Publication No. 8-48220, there has been known an in-stop brake system designed such that, when a predetermined period of time elapses after a brake pedal is stepped on while a motor vehicle is in stop, an opening and closing valve installed in a brake fluid passage defined between a master cylinder and a wheel cylinder is put in a closed condition to maintain a braking force even if the driver releases the brake pedal from stepping.

There is a problem which arises with such an in-stop brake system, however, in that problems can occur because the driver is required to wait for the predetermined period of time in a state of stepping on the brake pedal until the brake system automatically operates after a stop. In addition, since a braking force is only maintained in accordance with the stepping force by the driver, there is a possibility that the motor vehicle will start to move if the braking force maintained due to the stepping by the driver is low.

SUMMARY OF THE INVENTION

The present invention has been developed with a view to eliminating these problems, and it is therefore an object of this invention to provide an in-stop brake system which is put in further practical use and which is easy to use.

Bearing the above object in mind, according to the present invention, there is provided an in-stop brake system comprising: stop detecting means for detecting a stop condition of a motor vehicle; accelerator detecting means for detecting an operating quantity of an accelerator pedal; brake detecting means for detecting an operating quantity of a brake pedal or a braking force varying in accordance with the operating quantity of the brake pedal; valve means provided on a brake fluid passage between a wheel cylinder and a master cylinder for closing or opening thereof; and a control unit for controlling an operation of an in-stop brake and an opening and closing operation of the valve means on the basis of outputs of the stop detecting means, the accelerator detecting means and the brake detecting means. The control unit comprises; operation decision means for allowing the in-stop brake to operate when a braking force generated upon a driver stepping on the brake pedal exceeds a predetermined braking force under the conditions that the motor vehicle is in a stopped condition and that the accelerator pedal is in a released condition, the operation decision means being further operable to inhibit the in-stop brake from being operated when the accelerator pedal is stepped on; and valve drive means for closing the valve means when the operation decision means allows the operation of the in-stop brake, and further for opening the valve means when the operation decision means inhibits the operation of the in-stop brake.

In a preferred form of the invention, the in-stop brake system further comprises grade detecting means for directly or indirectly detecting an inclination between front and rear portions of the motor vehicle as a road grade. The control unit receives an output of the grade detecting means so that it changes the value of the predetermined braking force, which is one of the in-stop brake operation conditions, in accordance with the detected road grade.

In another preferred form of the invention, the in-stop brake system further comprises warming-up detecting means for directly or indirectly detecting a warming-up condition of an engine of the motor vehicle. The control unit receives an output of the warming-up detecting means so that it changes the value of the predetermined braking force, which is one of the in-stop brake operation conditions, in accordance with the detected engine warming-up condition.

In a further preferred form of the invention, the value of the predetermined braking force, which is one of the in-stop brake operation conditions, is set to a value capable of maintaining the stopping of the motor vehicle without regard to a road grade or a warming-up condition of an engine of the motor vehicle.

In a yet further preferred form of the invention, the in-stop brake system further comprises warning means for informing a motor vehicle driver of a control condition of the in-stop brake, wherein the control unit makes the warning means give a warning when a movement of the motor vehicle is detected in spite of the in-stop brake being in operation.

In a still further preferred embodiment of the invention, the warning, which is given by the warning means when a movement of the motor vehicle is detected in spite of the in-stop brake being in operation, is stopped through at least a brake operation by the driver.

In a further preferred form of the invention, the control unit releases the in-stop brake from its operating condition when the brake pedal is once released or substantially released from its operating condition after the in-stop brake has been put into operation and subsequently the brake pedal is again stepped on to generate the predetermined braking force.

In a further preferred form of the invention, the in-stop brake system further comprises a check valve coupled in parallel to the valve means for allowing only flow of a brake fluid from the master cylinder to the wheel cylinder, wherein, when the brake fluid passes through the check valve upon the driver re-stepping on the brake pedal to cause an increase in a braking force of the wheel cylinder, the control unit makes a decision that the brake pedal is once released or substantially released from its operating condition after the in-stop brake has been put into an operating condition and subsequently the brake pedal is again stepped on to generate the predetermined braking force.

In a further preferred form of the invention, the control unit makes a stop lamp go on while the in-stop brake is in operation even if the brake pedal is in a released condition.

In a further preferred form of the invention, the in-stop brake system further comprises engine detecting means for detecting whether the engine is stopped or not. The control unit receives an output of the engine detection means so that it inhibits the in-stop brake from being operated during stoppage of the engine.

In a further preferred form of the invention, the in-stop brake system further comprises a switch through which a driver is able to make a selection such that the in-stop brake is permitted or inhibited to operate.

In a further preferred form of the invention, the in-stop brake system further comprises: engine detecting means for detecting whether an engine of the motor vehicle is stopped or not; hand brake detecting means for detecting an operating condition of a hand brake; and warning means for generating a warning. The control unit receives outputs of the engine detecting means and the hand brake detecting means so that it makes the operation of the in-stop brake continue only for a predetermined period of time and the warning means to give a warning even if the engine is stopped during the time when the in-stop brake is in operation and the hand brake is out of operation.

In a further preferred form of the invention, the operations of the in-stop brake and the warning means, which are continued for the predetermined period of time even if the engine is stopped during the time when the in-stop brake is in operation and the hand brake is out of operation, are stopped at least by a driver stepping on the brake pedal or operating the hand brake.

In a further preferred form of the invention, the in-stop brake system further comprises gear position detecting detecting means so that it precludes, when the gear position of the transmission assumes a parking position, the in-stop brake and the warning means from being continuously operated for the predetermined period of time even upon the engine being stopped during the operation of the in-stop brake and the non-operation of the hand brake.

In a further preferred form of the invention, the in-stop brake system further comprises gear position detecting means for detecting a gear position of a transmission. The control unit receives an output of the gear position sensing means so that it inhibits the in-stop brake from being released upon a driver stepping on an accelerator pedal or a brake pedal when the transmission is not operably coupled with the engine.

In a further preferred form of the invention, the in-stop brake system further comprises gear position detecting means for detecting a gear position of a transmission. The control unit receives an output of the gear position detecting means so that it inhibits the in-stop brake from being operated when the gear position of the transmission is at a reverse position.

In a further preferred form of the invention, the in-stop brake system further comprises: door detecting means for detecting an opened/closed condition of a door of at least a driver's seat; and warning means for generating a warning when the in-stop brake is in operation and when the door is opened.

In a further preferred form of the invention, the valve means is energized into a closed condition by a control signal and de-energized into an opened condition in the absence of the control signal.

In a further preferred form of the invention, the in-stop brake system further comprises a bypass circuit connected in parallel to an electric resistor on an electric line between the valve means and the valve drive means. The valve means is energized through the bypass circuit at an initial energization time, and after the valve means is placed into a closed condition, the energization by the bypass circuit is stopped and energization of the valve means is accomplished through the electric resistor disposed in parallel to the bypass circuit.

In a further preferred form of the invention, when a voltage of a battery for supplying power to the valve means goes down, the energization of the valve means by the bypass circuit is maintained while the energization of the valve means made through the electric resistor disposed in parallel to the bypass circuit is inhibited.

The above and other objects, features and advantages of the present invention will become more readily apparent from the following detailed description of the preferred embodiments taken in conjunction with the accompanying drawings.

BRIEF DESCRIPTION OF THE DRAWINGS

FIGS. 19A to 19D are illustrations of an example of operations of a warning means according to a fifteenth embodiment of this invention;

DESCRIPTION OF THE PREFERRED EMBODIMENTS

Embodiments of the present invention will be described hereinbelow with reference to the accompanying drawings.

First Embodiment

Figure 1:
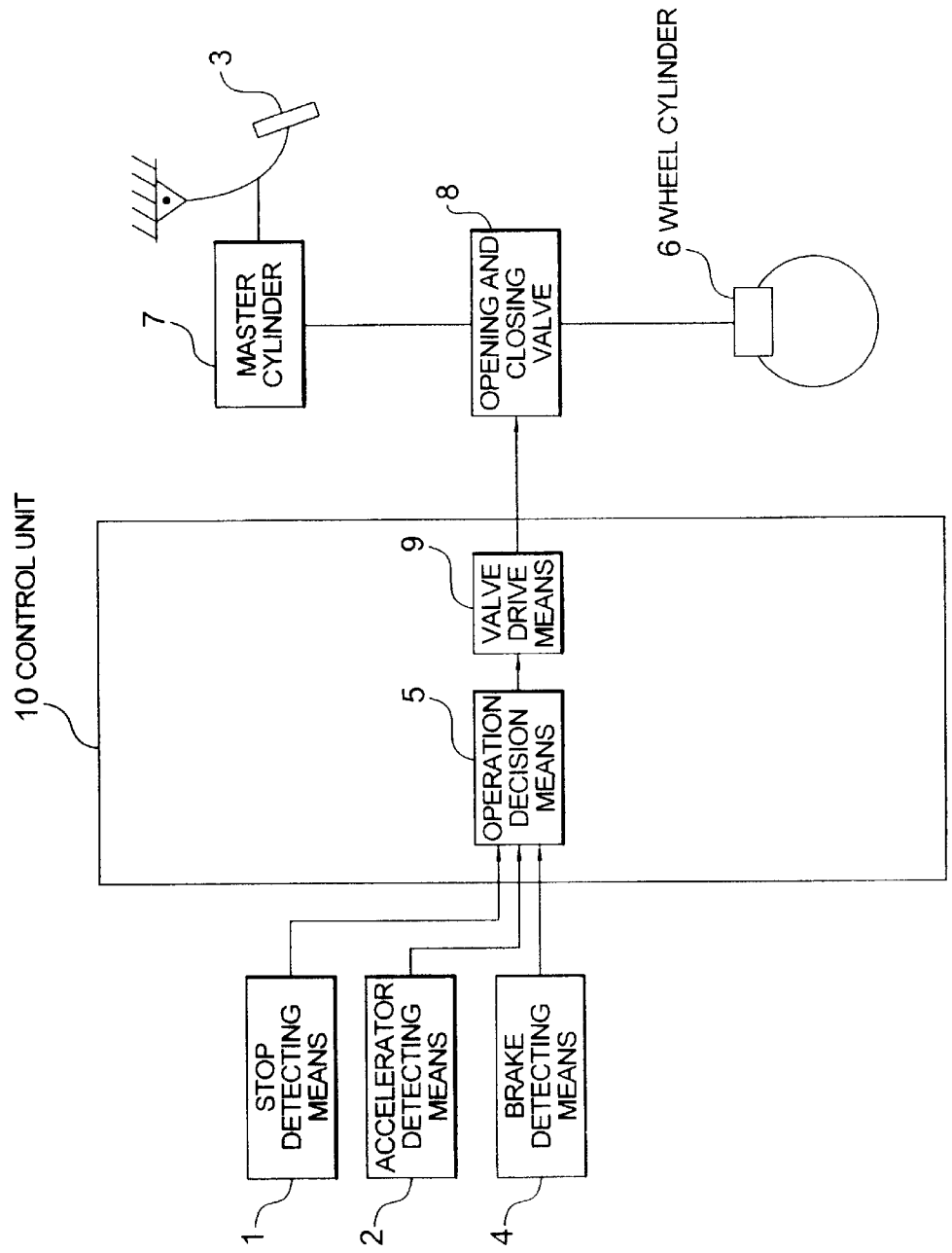
FIG. 1 is an illustration of an arrangement of an in-stop brake system according to a first embodiment of the present invention.
Figure 2:
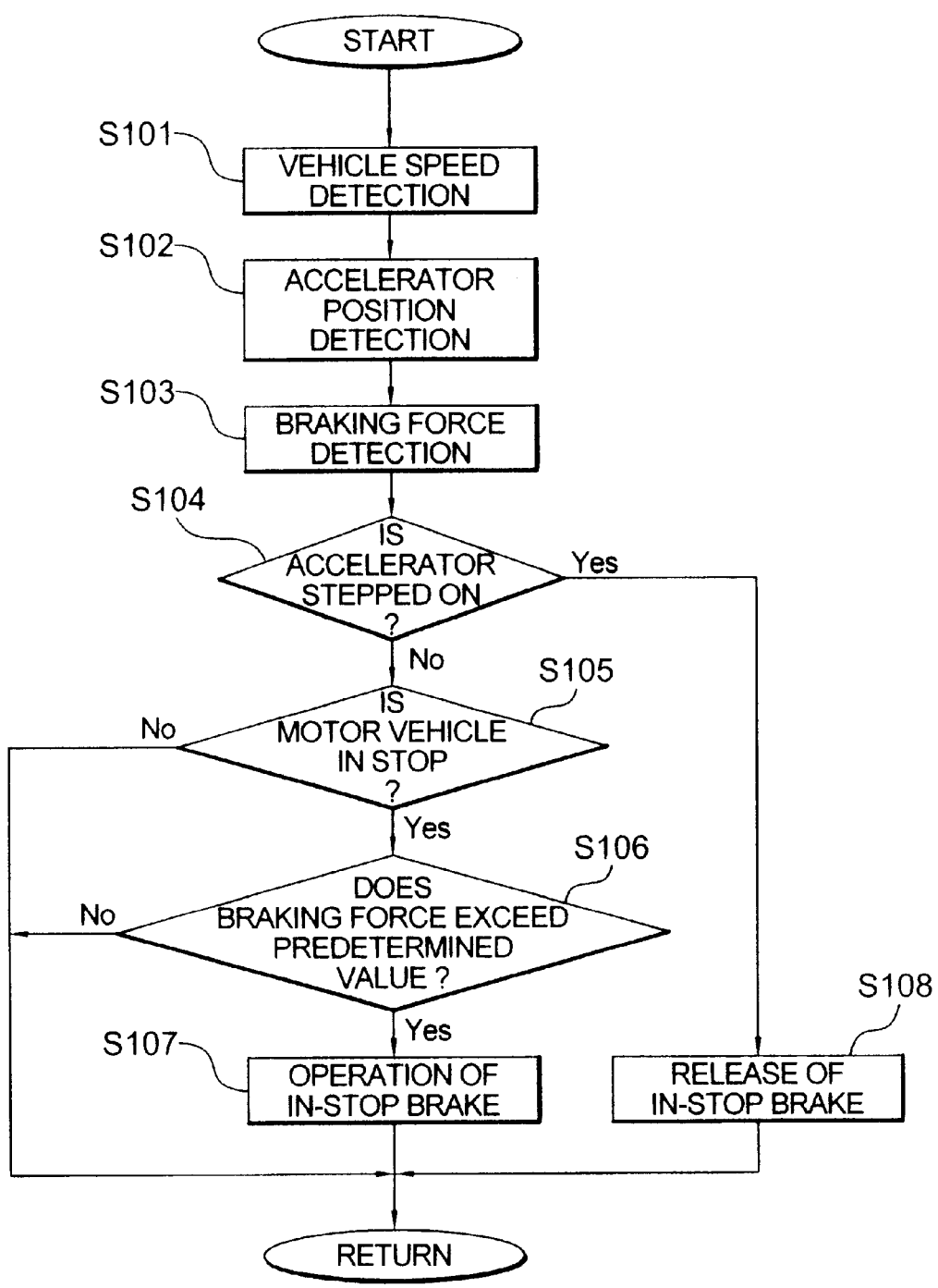
FIG. 2 is a flow chart showing an operation of the in-stop brake system according to the first embodiment of this invention.

FIGS. 1 and 2 show an in-stop brake system according to a first embodiment of this invention.

This in-stop brake system according to the first embodiment is, as shown in FIG. 1, composed of a stop detecting means 1 for detecting a stopping condition of a motor vehicle, an accelerator detecting means 2 for detecting an operating quantity of an accelerator (not shown) by the driver, a brake detecting means 4 for detecting an operating quantity of a brake pedal 3 or a braking force varying in accordance with the operating quantity of the brake pedal 3, an operation decision means 5 for permitting an in-stop braking operation when the motor vehicle is stopped, the accelerator is in the released condition and the braking force generated by the stepping-on of the accelerator by the driver exceeds a given braking force predetermined, and for inhibiting the in-stop braking operation when the accelerator is stepped on by the driver, an opening and closing valve 8 installed in a brake fluid passage defined between a wheel cylinder 6 and a master cylinder 7, and a valve drive means 9 for closing the opening and closing valve 8 when the operation decision means 5 permits the in-stop braking operation and for opening the opening and closing valve 8 when the operation decision means 5 inhibits the in-stop braking operation. The operation decision means 5 and the valve drive means 8 constitute a control unit 10 which is designed to execute various kinds of decision control as will be described herein later.

As the stop detecting means 1, it is possible to employ at least one of a wheel speed sensor, an output shaft rotational speed sensor for detecting a rotational speed of an output shaft of a transmission, and other speed sensors.

Furthermore, as the accelerator detecting means 2, it is possible to use at least one of an accelerator position sensor for detecting a position of the accelerator, an idle switch for detecting the fully closed condition of a throttle valve (not shown), a throttle position sensor for detecting the opening degree of the throttle valve, and other sensors.

Still further, as the brake detecting means 4, it is possible to employ at least one of a brake switch made to operate when the brake pedal 3 is stepped on up to a predetermined position, a brake pedal stroke sensor for detecting a position of the brake pedal 3, a method of indirectly detecting a braking force through the use of a stepping force sensor for detecting the stepping force on the brake pedal 3 by the driver, a method of directly detecting the braking force through the use of a wheel cylinder pressure sensor for detecting a brake fluid pressure in the wheel cylinder 6 or a master cylinder pressure sensor for detecting the brake fluid in the master cylinder 7, and other methods.

Secondly, referring to the flow chart of FIG. 2, a description will be made hereinbelow of an operation of the in-stop brake system according to the first embodiment.

First of all, in a step S101, a detection of the vehicle speed is made through the use of the stop detecting means 1, and in a step S102, a detection of the accelerator position is made through the accelerator detecting means 2, and further, in a step S103, a detection of the braking force is made through the brake detecting means 4.

Subsequently, the operational flow advances to a step S104 to decide, on the basis of the accelerator position detected in the step S102, whether the accelerator is stepped on or not. If not stepped on, the operational flow proceeds from the step S104 to a step S105 to decide, on the basis of the vehicle speed detected in the step Slol, whether or not the motor vehicle is stopped. If stopped, the operational flow goes from the step S105 to a step S106 to decide whether or not the braking force detected in the step S103 exceeds a predetermined value.

If it exceeds the predetermined value, because of satisfying the conditions that the motor vehicle is stopped, the accelerator is in the released condition and the braking force is above a predetermined braking force, the step S106 is followed by a step S107 where the operation decision means 5 permits the in-stop braking operation so that the valve drive means 9 is driven to close the opening and closing valve 8. That is, when the a force exceeding a given value works on the brake pedal while the motor vehicle is in stop, the stopped braking operation immediately takes place.

Following this, if the decision of the step S104 shows that the accelerator is in the stepped-on condition, the step S104 is followed by a step S108 in which the operation decision means 5 inhibits the in-stop braking operation so that the valve drive means 9 is stopped to open the opening and closing valve 8. That is, the in-stop braking operation comes to an end.

Furthermore, if the decision of the step S105 indicates that the motor vehicle is not in stop, or of the decision of the step S106 shows that the braking force does not reach the predetermined value, the in-stop braking operation by the valve drive means 9 is not permitted, thus terminating the processing.

Incidentally, the above-mentioned decision processing depends upon the operation decision means 5 of the control unit 10.

Figure 3:
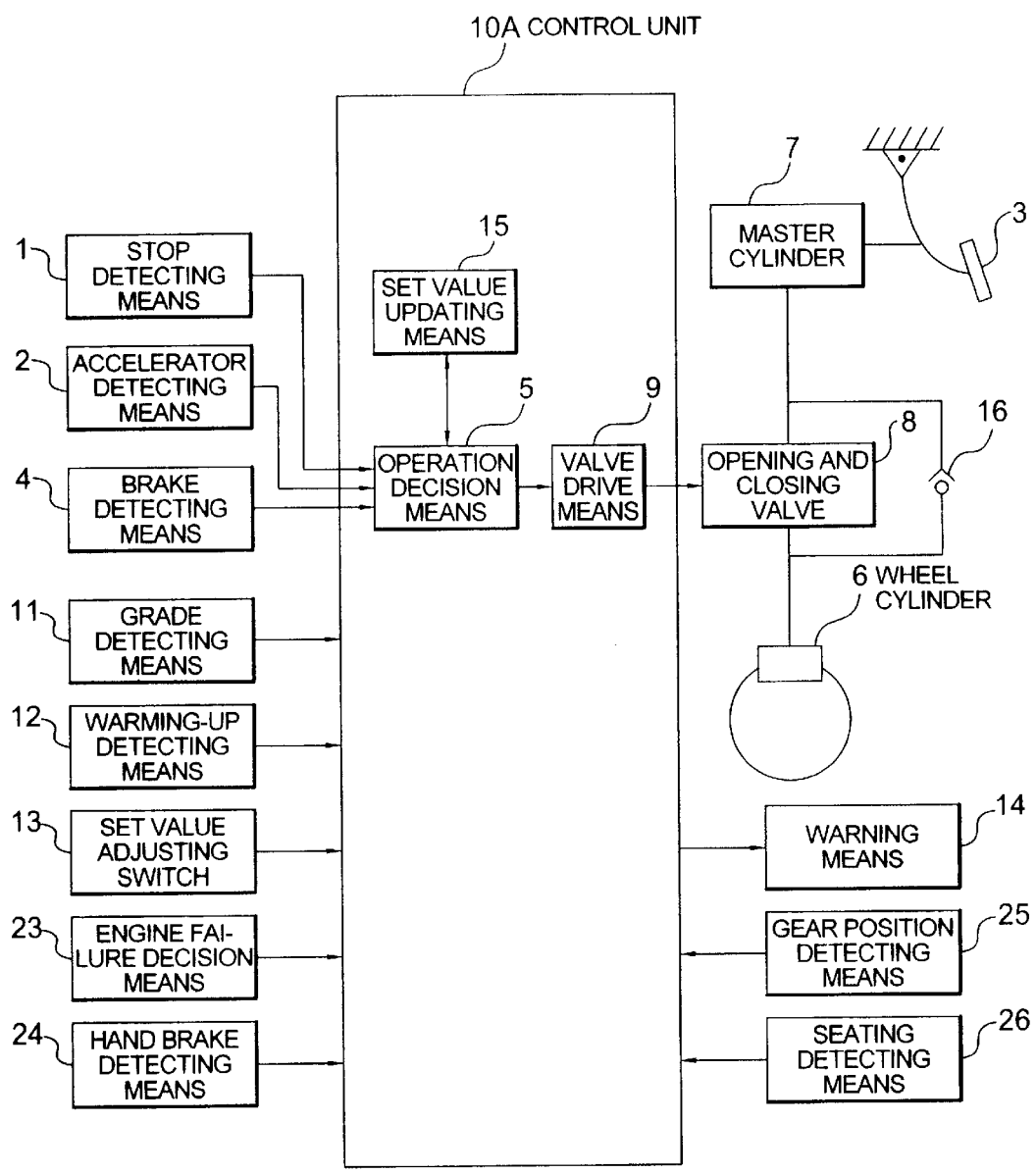
FIG. 3 is a illustration of an arrangement of an in-stop brake system according to a second embodiment of this invention.

FIG. 3 is a block diagram showing an arrangement of an in-stop brake system according to different embodiments of this invention.

The in-stop brake system shown in FIG. 3 comprises, in addition to the above-mentioned arrangement shown in FIG. 1, a grade (inclination) detecting means 11, a warming-up detecting means 12, a set value adjusting switch 13, a warning means 14, a set value updating means 15, an engine failure (stalling) decision means 23, a hand brake detecting means 24, a gear position detecting means 25, and a seating detecting means 26. These are all components listed up for the convenience of the following embodiments, and in fact, the components are differently taken at every embodiment. Besides, the operation decision means 5, the valve drive means 9 and set value updating means 15 organize a portion of a control unit 10A for accomplishing various kinds of decision control as will be described herein later.

Second Embodiment

In addition, referring to FIG. 3, a description will be given hereinbelow of an in-stop brake system according to a second embodiment of this invention.

In the second embodiment, as shown in FIG. 3, the grade detecting means 11 is provided to directly or indirectly detect the grade at the front and rear portions of a motor vehicle, and the control unit 10A changes a predetermined braking force being one of the in-stop braking operation conditions in accordance with the road grade on the basis of the output of the grade detecting means 11. That is, utilizing the fact that the relationship between the road grade and the braking force taken for the vehicle stop is as shown in FIG. 4, the aforesaid predetermined braking force needed for the vehicle stop is altered in accordance with the road grade at the vehicle stop so that, irrespective of the variation of the road grade, the in-stop braking operation can surely take place in a state where the driver provides the braking force necessary for the vehicle stop.

Furthermore, since the increase in the idle speed or in torque is made to promote the warming-up or to avoid the engine stalling in the engine cooled condition, when the engine is in a cooled condition, the engine torque tends to be higher than after the warming-up of the engine, and therefore, in cases where an automatic transmission mounted motor vehicle stops in the drive range, when the engine is in the cooled condition, the braking force needed for maintaining the vehicle stop is required to be increased.

Accordingly, as shown in FIG. 3, the warming-up detecting means 12 is provided to directly or indirectly detect the warming-up condition of the engine, and the control unit 10A changes the predetermined braking force being one of the in-stop braking operation conditions in accordance with the warming-up condition on the basis of an output signal from the warming-up detecting means 12. That is, the control unit 10A changes the predetermined braking force on the basis of the relationship, shown in FIG. 5, between the engine warming-up condition and the braking force offsetting the engine torque due to the warming-up correction, with the result that, regardless of the variation of the warming-up condition, the in-stop braking operation takes place in a state where the driver surely provides the braking force needed for the vehicle stop.

Figure 4:
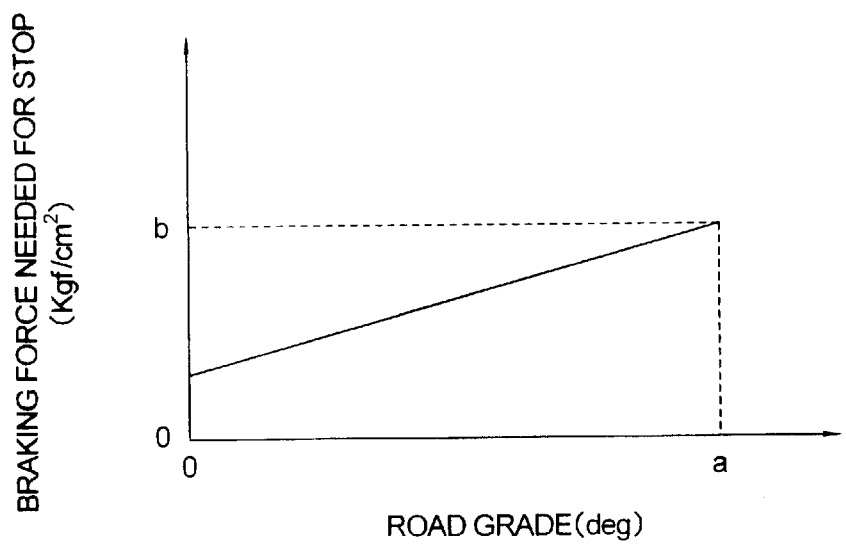
FIG. 4 is a graphic illustration of the relationship between a grade (inclination) of a road and a braking force needed for a stop.
Figure 5:
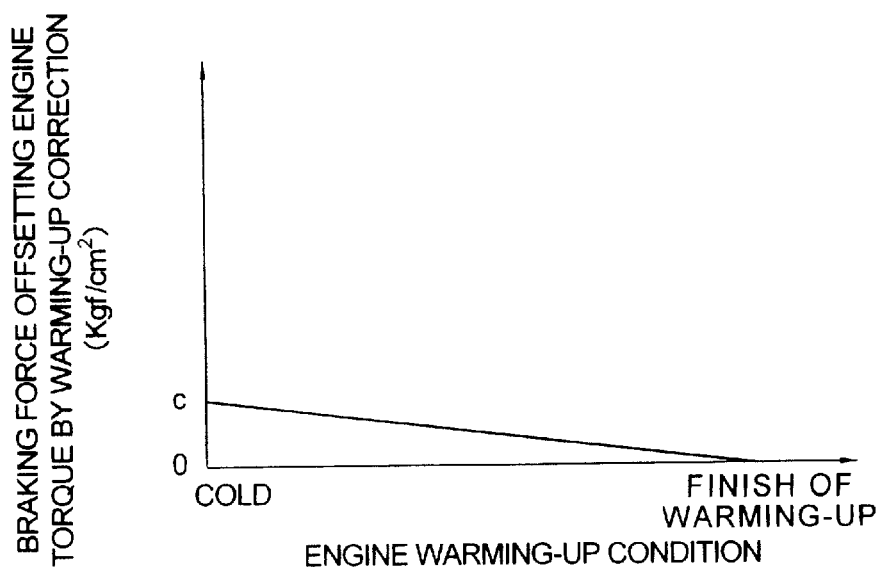
FIG. 5 is a graphic illustration of the relationship between a warming-up condition of an engine and a braking force offsetting an engine torque by warming-up correction.

Furthermore, in FIG. 4, a grade a is previously prescribed as the upper limit of the road grade or the using upper limit of the in-stop brake system, and the in-stop brake force at that time is taken as a value b. In addition, if the fact that the maximum value of the braking force offsetting the engine torque due to the warming-up correction is taken as a value c in FIG. 5 is verified in advance and the predetermined braking force forming one of the in-stop braking operation conditions is previously set to a value above (b+c), irrespective of the presence or absence of the grade detecting means 11 or the warming-up detecting means 12, it is possible that the in-stop braking operation takes place in a state where the driver always certainly produces the braking force needed for the vehicle stop.

Third Embodiment

Figure 6A:
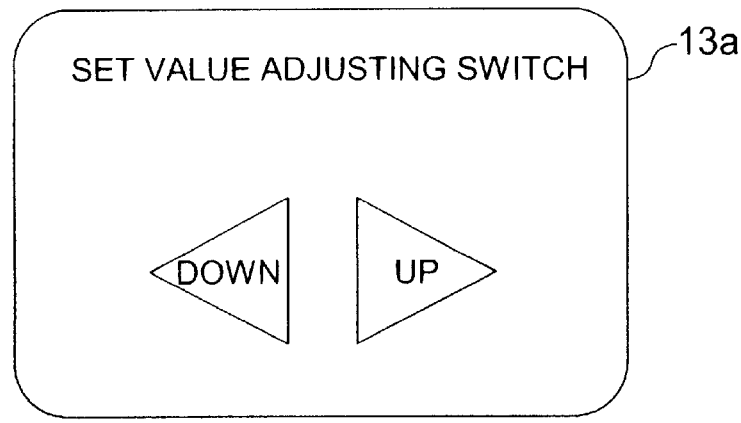
FIG. 6A is an illustration of an example of set value adjusting switches according to this invention.
Figure 6B:
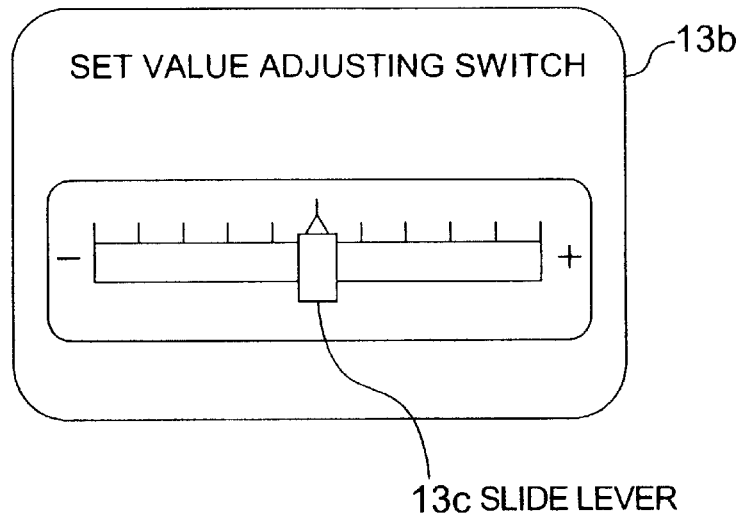
FIG. 6B is an illustration of another example of set value adjusting switches according to this invention.
Figure 7:
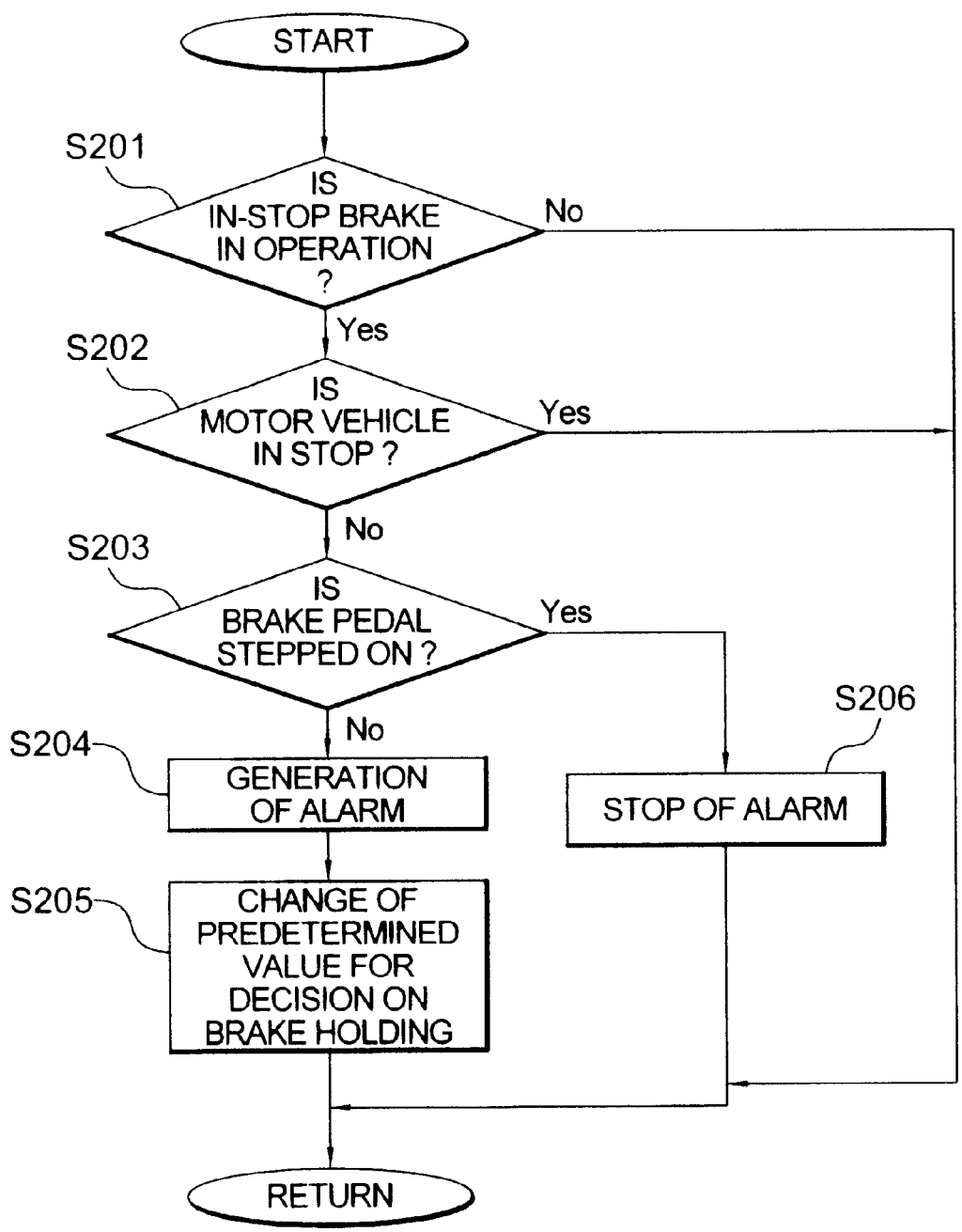
FIG. 7 is a flow chart showing an operation of an in-stop brake system according to a third embodiment of this invention.

FIGS. 6A, 6B and 7 are illustrations of an in-stop brake system according to a third embodiment of this invention, and showing a control method to be taken for when a movement of the motor vehicle is detected although the in-stop braking operation is done. The arrangement of this third embodiment is wholly similar to that of the first embodiment shown in FIGS. 1 and 2.

If the predetermined braking force forming one of the in-stop braking operation conditions is excessively low, the actual motor vehicle can start to move although being in the in-stop braking operation. In this case, in a manner that, as shown in FIG. 3, the set value adjusting switch 13 is provided which can adjust the predetermined braking force value forming one of the in-stop braking operation conditions so that the set value is adjusted to a relatively large value from the external side, the re-occurrence of such a situation is preventable thereafter.

FIGS. 6A and 6B show different examples of the set value adjusting switch 13.

In FIG. 6A, a set value adjusting switch 13a is equipped with an "UP" key and a "DOWN" key, and whenever the "UP" key is pressed, the aforesaid predetermined braking force is changed to become a larger value, and whenever the "DOWN" key is pressed, the predetermined braking force is changed to become a smaller value.

On the other hand, in FIG. 6B, a set value adjusting switch 13b is of a slide type comprising a slide lever 13c. When the slide lever 13c is shifted in the+direction, the predetermined braking force is changed to increase, and when being shifted in the—direction, the predetermined braking force is changed to decrease.

Furthermore, if a detection of movement of the motor vehicle is made although the motor vehicle is in the in-stop braking operation, as shown in FIG. 3, the warning means 14 gives a warning or an alarm to immediately inform the driver of this situation to urge the driver towards stepping on the brake pedal.

Still further, after the completion of the braking operation by the driver, the warning means 14 stops giving the alarm. That is, after the driver recognizes such a situation, the alarm offensive to the ear can immediately come to an end.

Moreover, since, as shown in FIG. 3, the set value updating means 15 is provided to change the predetermined braking force value forming one of the in-step braking operation conditions, in the case that the detection of movement of the motor vehicle is made although the motor vehicle is in the in-stop braking operation, the set value updating means 15 automatically updates the predetermined braking force value to a larger value, with the result that the re-occurrence of such a situation is preventable afterwards.

Furthermore, referring to the flow chart of FIG. 7, a description will be made hereinbelow of the operations of the warning means 14 and the set value updating means 15.

Incidentally, the operation shown in FIG. 7 follows the flow chart of FIG. 2.

First, a step S201 is executed to decide whether or not the in-stop brake is in operation, and the next step S202 is done to decide whether or not the motor vehicle is in stop. If the in-stop brake is in operation and the motor vehicle is not in stop, the operational flow goes to a step S203. Otherwise, the processing comes to an end without doing anything.

The step S203 is for deciding whether the brake pedal is stepped on or not. If not stepped on, the operational flow goes to a step S204 to give a warning or an alarm.

Subsequently, the operational flow advances from the step S204 to a step S205 to change the predetermined braking force being one of the in-stop braking operation conditions to a larger value, and the processing comes to an end.

As a result, if the movement of the motor vehicle is detected although the in-stop brake is in operation, the warning means 14 gives the alarm while the set value updating means 15 automatically updates the set value to a larger value.

Incidentally, if the brake pedal is stepped on, the operational flow proceeds from the step S203 to a step S206 so that the warning means 14 stops the alarm, and the processing terminates.

Fourth Embodiment

Figure 8:
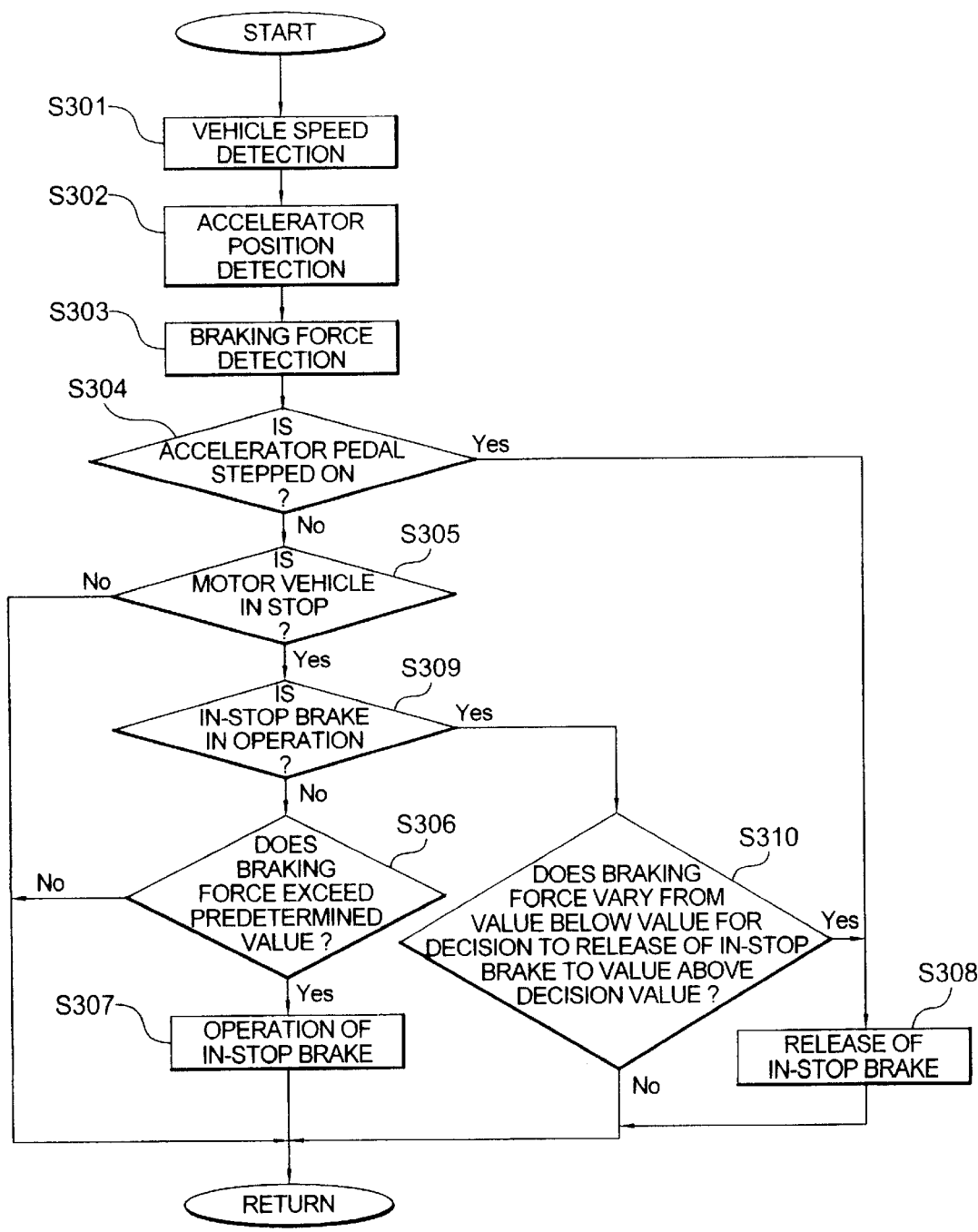
FIG. 8 is a flow chart showing an operation of an in-stop brake system according to a fourth embodiment of this invention.

FIG. 8 is a flow chart showing an operation of an in-stop brake system according to a fourth embodiment of this invention. The entire arrangement of the in-stop brake system according to the fourth embodiment is nearly similar to that of the first embodiment shown in FIG. 1. The operation of the fourth embodiment will be described hereinbelow with reference to the flow chart of FIG. 8.

The operation from a step S301 to a step S308 in FIG. 8 is the same as the operation from the step S108 to the step S108 in FIG. 2, and the detailed description thereof will be omitted for brevity.

In the case that the accelerator is not stopped on and the motor vehicle is in stop, the operational flow advances from a step S305 to a step S309 to decide whether or not the in-stop brake is in operation. If the in-stop brake is not in operation, a step S104 follows to conduct the same processing as in FIG. 2. On the other hand, if the decision of the step S309 shows that the in-stop brake is in operation, the operational flow goes to a step S310.

The step S310 is for deciding whether or not the braking force generated by the stepping-on of the brake pedal varies from a value below a braking force, whereby a decision is made to the releasing from the in-stop braking, to a value above this decision-making braking force. That is, after the in-stop braking operation, the brake pedal is once released and a decision is again made on whether or not the brake pedal is stepped on by a predetermined force.

In the case that the braking force generated by the stepping-on of the brake pedal 3 varies from a value below the braking force, whereby a decision is made to the releasing from the in-stop braking, to a value above the decision-making braking force, the operational flow goes to a step S308 to release the in-stop brake, then terminating the processing. on the other hand, if not varying from a value below the braking force, whereby a decision is made to the releasing from the in-stop braking, to a value above the decision-making braking force, the processing terminates without conducting the releasing from the in-stop braking.

Besides, if the releasing from (removal of) the in-stop braking is made when the braking force due to the re-stepping-on of the brake pedal 3 becomes equal to the braking force maintained by the in-stop braking operation, that releasing from the in-stop braking is done in a state where almost no difference in pressure between the wheel cylinder 6 and the master cylinder 7 exists, so that a smooth switching to the brake under control of the driver becomes feasible.

Furthermore, as shown in FIG. 3, a check valve 16 is coupled in parallel to the opening and closing valve 8 to allow only the flow of the brake fluid from the master cylinder 7 side to the wheel cylinder 6 side. With this construction, by the re-stepping-on of the brake pedal 3, the brake fluid passes through the check valve 16, and if the releasing from the in-stop braking is made when the braking force on the wheel cylinder 6 side rises, that releasing from the in-stop braking is done in a state where the difference in pressure between the wheel cylinder 6 and the master cylinder 7 does not exist at all, so that smooth switching to the brake under control of the driver becomes possible.

Fifth Embodiment

Figure 9:
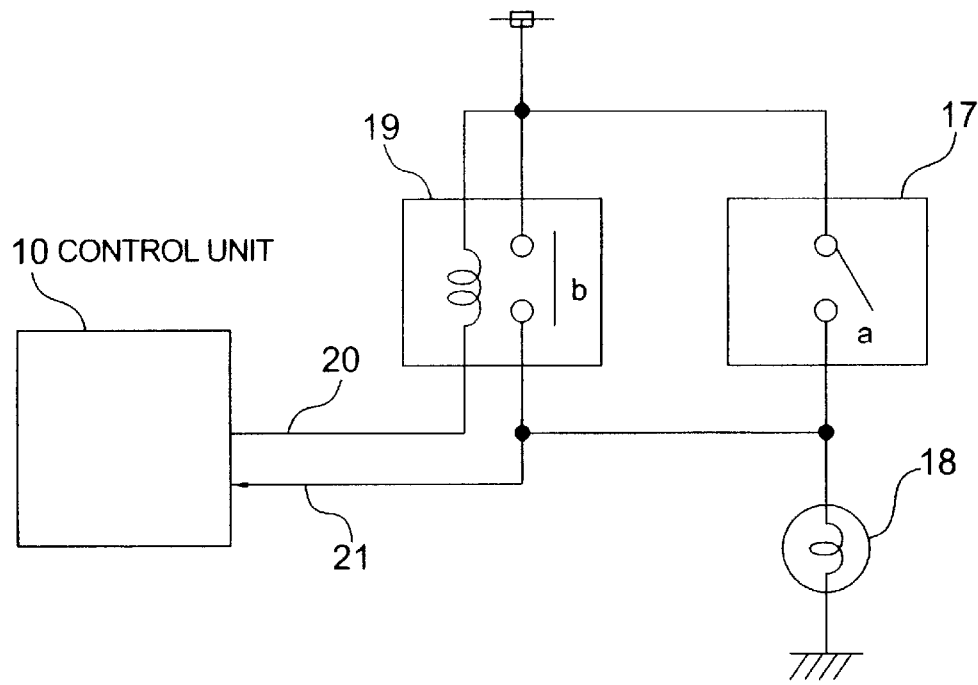
FIG. 9 is an illustration of an arrangement of an example of stop lamp control circuits according to a fifth embodiment of this invention.

FIG. 9 is an illustration of an in-stop brake system according to a fifth embodiment of this invention. The in-stop brake system according to the fifth embodiment is, as shown in FIG. 9, constructed so that, even while the driver releases the brake pedal, the stop lamp 18 can go on.

In FIG. 9, in, a brake switch 17 is constructed such that, when the driver steps on the brake pedal 3, its contact a takes a closed condition so that the stop lamp 18 goes on.

Furthermore, a relay 19 is made so that, when the control unit 10 places a control line 20 into a grounded condition, its contact b is put into a closed condition so that the stop lamp 18 comes on.

A detection line 21 makes a detection as to whether or not the brake switch 17 and the stop lamp 18 operate normally.

With the above-described arrangement, even if the driver does not step on the brake pedal (the contact a of the brake switch 17 assumes the open condition), the stop lamp 18 can go on in a manner that the control unit 10 places the control line 20 into the grounded condition (the contact b of the relay 19 takes the closed condition).

Still further, in the case that the state of the detection line 21 does not vary although the brake detecting means detects that the driver steps on the brake pedal 3, a decision can be made to that the trouble on the brake switch 17 or the brake lamp 18 occurs.

Sixth Embodiment

Figure 10:
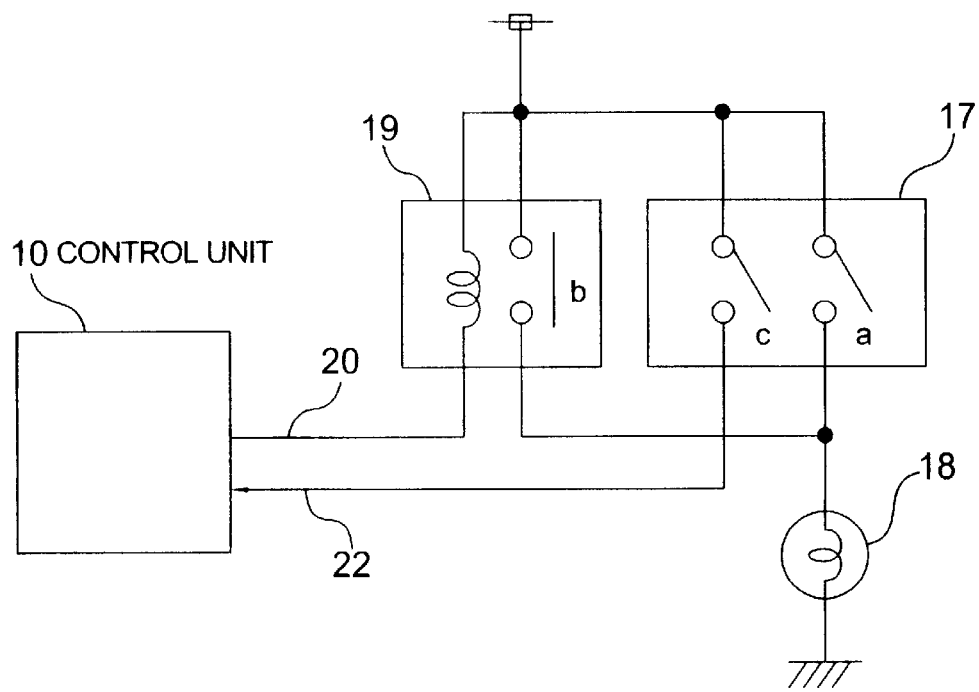
FIG. 10 is an illustration of an arrangement of an example of stop lamp control circuits according to a sixth embodiment of this invention.

FIG. 10 is an illustration of an in-stop brake system according to a sixth embodiment of this invention. As well as the above-described fifth embodiment, the in-stop brake system according to the sixth embodiment is constructed so that, when the in-stop brake is in operation, the stop lamp 18 can go on even while the driver releases the brake pedal.

As shown in FIG. 10, in a brake switch 17, a contact c is added in parallel to a contact a (that is, both the contacts a and c go into the closed condition when the driver steps on the brake pedal 3). In addition, in the case that the state of the detection line 22 does not vary although the brake detecting means detects that the driver steps on the brake pedal, a decision is made to that the trouble on the brake switch 17 or the brake lamp 18 occurs.

Incidentally, in the arrangement shown in FIG. 10, a detection as to whether or not the driver is stepping on the brake pedal during the in-stop braking operation, that is, in a state where the contact b of the relay 19 is in the closed condition, is possible on the basis of the operation of the brake switch 17.

Seventh Embodiment

Figure 11:
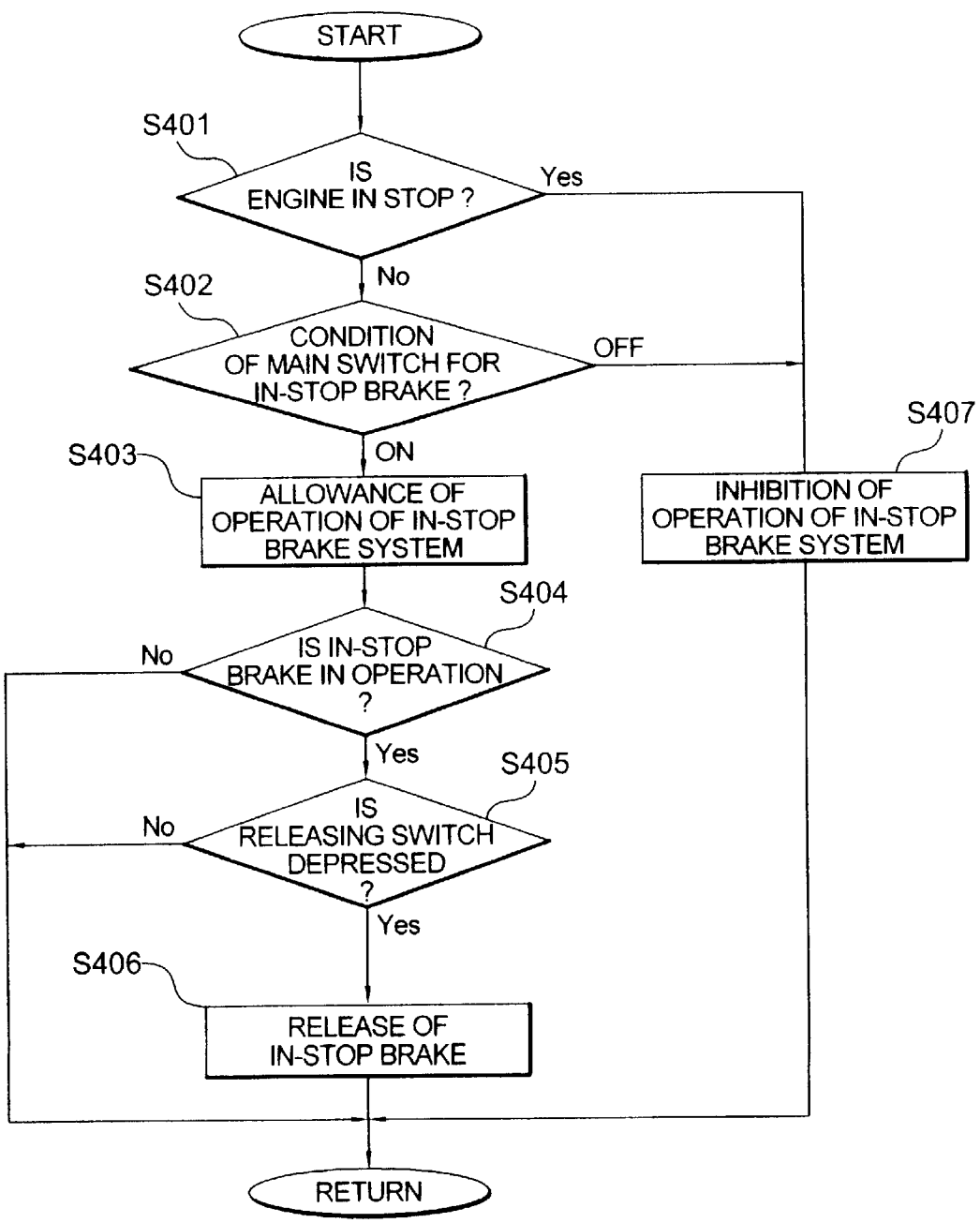
FIG. 11 is a flow chart showing an operation of an in-stop brake system according to a seventh embodiment of this invention.

FIG. 11 is a flow chart showing an operation of an in-stop brake system according to a seventh embodiment of this invention. The operation of the seventh embodiment will be described hereinbelow with reference to the flow chart of FIG. 11.

First of all, a step S401 is executed to decide whether or not the engine is stopped. The decision on whether or not the engine is stopped is possible by installing the engine failure decision means 23 as shown in FIG. 3. Concretely, the engine failure decision means 23 makes that decision on the basis of the engine speed, a generation detection terminal of an alternator, a key switch signal and others.

In this case, when the engine is stopped, the operational flow advances to a step S407 to inhibit the operation of the in-stop brake system, and the processing terminates. Incidentally, even if the in-stop brake is in operation immediately before this, because of the inhibition of the operation of the system, the in-stop brake is released from its operation.

Furthermore, if the decision of the step S401 indicates that the engine is not stopped, the operational flow goes to a step S402 to make a decision on the state of a main switch which can choose one of the allowance and inhibition of the operation of the in-stop brake system. Even if the main switch is in the OFF condition, the operational flow advances to the step S407 to inhibit the operation of the in-stop brake system, and the processing comes to an end.

If the decision of the step S402 indicates that the main switch is in the ON state, the operational flow proceeds to a step S403 to permit the operation of the in-stop brake system, with the in-stop brake is put in operation or released from its operation in accordance with the decision result by the operation decision means 5.

Still further, the next step S404 is executed to decide whether or not the in-stop brake is now in operation. If the in-stop brake is in operation, the operational flow goes from the step S404 to a step S405 to decide whether a releasing switch which can remove the in-stop braking operation is pressed or not.

If the releasing switch is pressed, a step S406 follows to release the in-stop brake from its operation, and the processing terminates.

On the other hand, if the decision of the step S404 indicates that the in-stop brake is not in operation, or if the decision of the step S405 shows that the releasing switch is not depressed, the processing comes to an end without conducting any operation.

Eighth Embodiment

Figure 12:
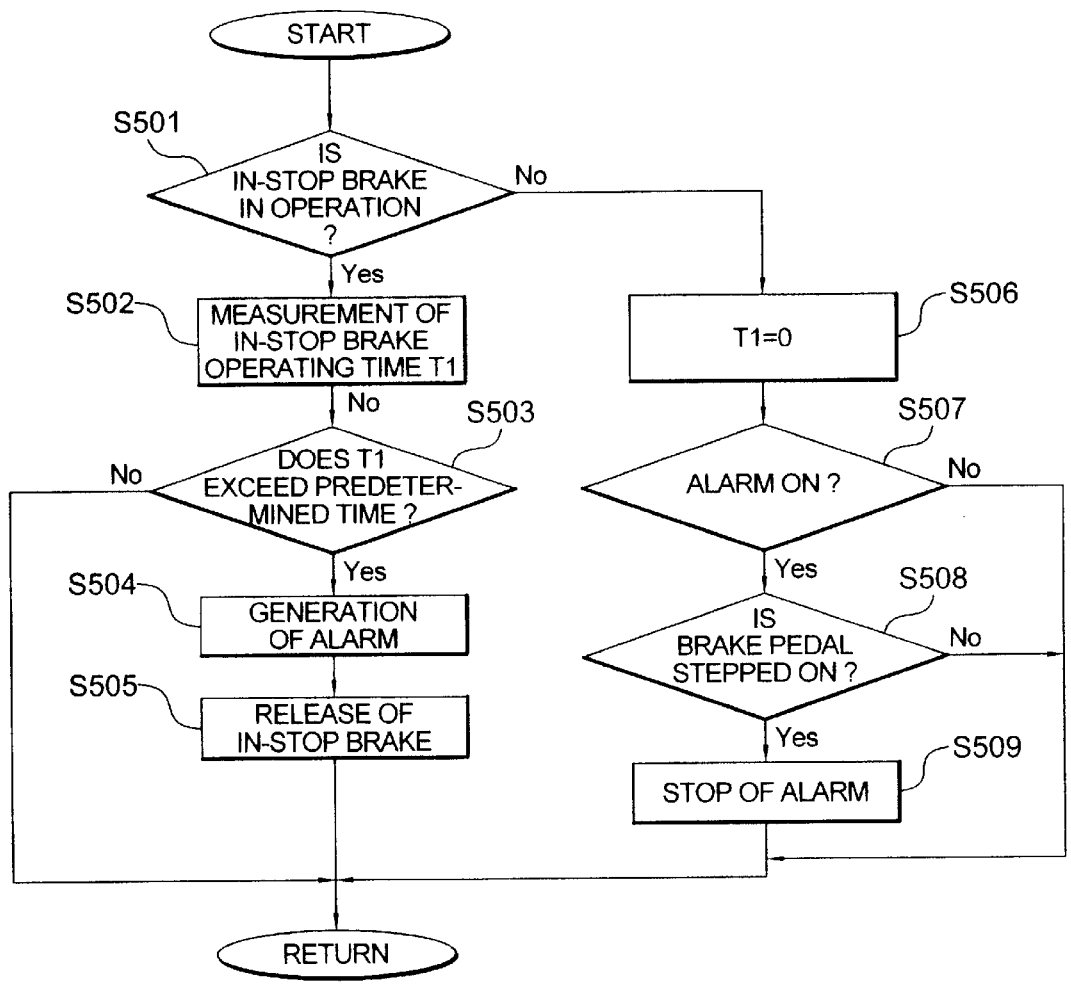
FIG. 12 is a flow chart showing an operation of an in-stop brake system according to an eighth embodiment of this invention.

FIG. 12 is a flow chart showing an operation of an in-stop brake system according to an eighth embodiment of this invention. The operation of the eighth embodiment will be described hereinbelow with reference to the flow chart of FIG. 12. The operation shown in FIG. 12 is subsequent to the above-mentioned flow chart of FIG. 2.

First of all, a step S501 is conducted to decide whether or not the in-stop brake is in operation. If the in-stop brake is in operation, a step S502 follows to measure an operating time T1 of the in-stop brake.

Furthermore, the operational flow advances to a step S503 to decide whether or not the operating time T1 of the in-stop brake becomes longer than a predetermined time. If the operating time T1 exceeds the predetermined time, the operational flow goes to a step S504 to give the alarm. Incidentally, in this case, it is also acceptable to force the in-stop brake into being released from its operating condition like a step S505.

On the other hand, if the in-stop brake is no in operation, the operational flow goes from the step S501 to a step S506 to set the in-stop brake operating time T1 at zero.

Subsequently, a step S507 follows to decide whether or not the alarm is generated. If the alarm is generated, the operational flow goes to a step S508 to decide whether the brake pedal 3 is stepped on or not. If the decision indicates that the brake pedal 3 is stepped on, the operational flow advances to a step S509 to stop the alarm. That is, a decision is made on the basis of the stepping-on of the brake pedal 3 such that the driver recognizes the compulsive cancellation of the in-stop braking operation, and the alarm is stopped. Accordingly, in the case where the brake pedal 3 is not stepped on, a decision is made such that the driver does not cope with the compulsive cancellation of the in-stop braking operation, and the processing directly comes to an end from the step S508.

Ninth Embodiment

Figure 13:
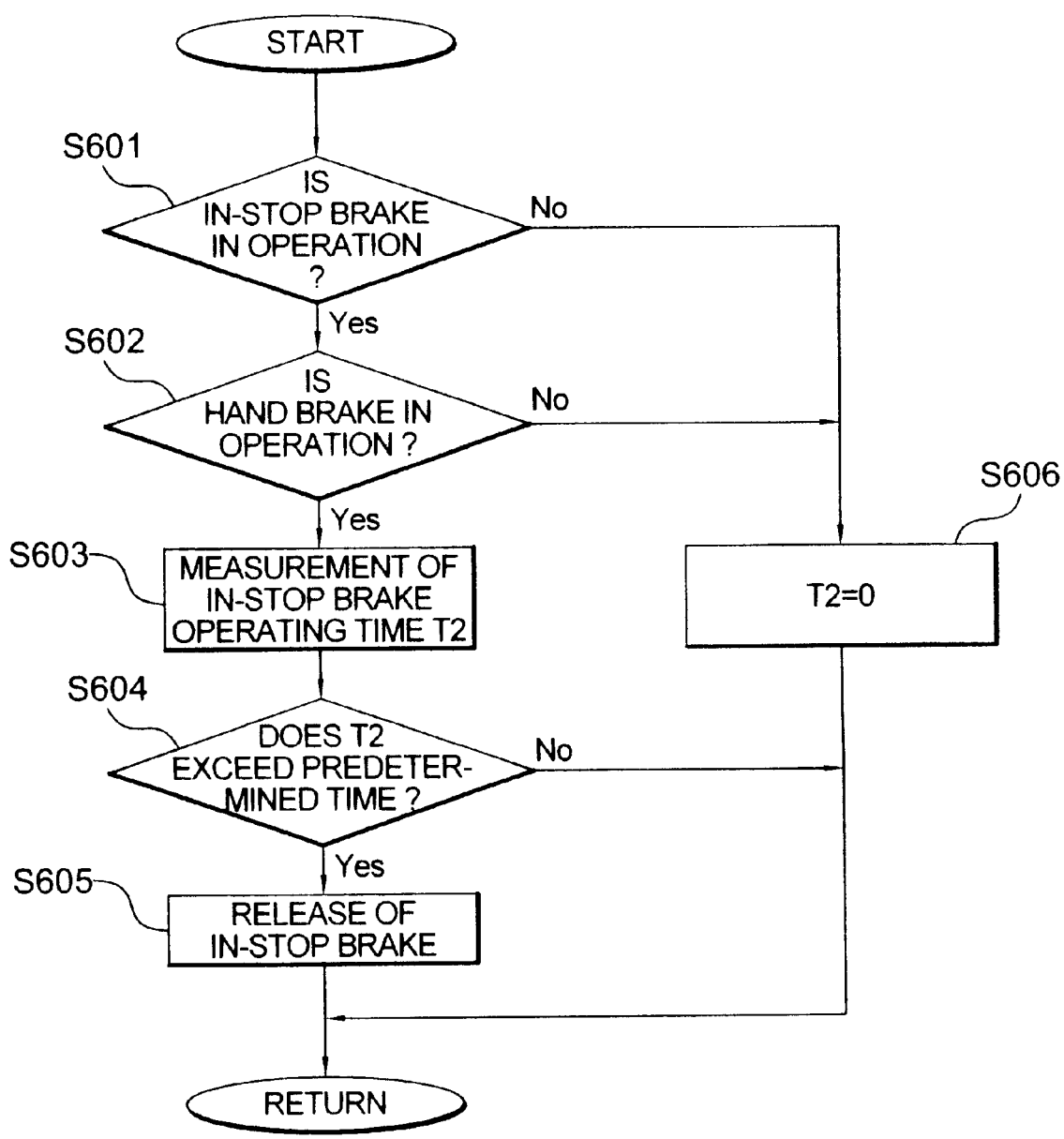
FIG. 13 is a flow chart showing an operation of an in-stop brake system according to a ninth embodiment of this invention.

FIG. 13 is a flow chart showing an operation of an in-stop brake system according to a ninth embodiment of this invention. The operation of the ninth embodiment will be described hereinbelow with reference to the flow chart of FIG. 13. Incidentally, the operation shown in FIG. 13 is subsequent to the flow chart of FIG. 2.

First of all, a step S601 is executed to decide whether or not the in-stop brake is in operation. If the in-stop brake is in operation, a step S602 follows to decide whether or not a hand brake is in operation. The decision as to whether or not the hand brake is in operation is made by the control unit 10 on the basis of the output signal of the hand brake detecting means 24 which detects the operating state of the hand brake.

If the hand brake is in operation, a step S603 follows to measure an operating time T2 of the in-stop brake.

Furthermore, the operational flow advances to a step S604 to decide whether or not the in-stop brake operating time T2 becomes longer than a predetermined time. If the in-stop brake operating time T2 does not exceed the predetermined time, the processing terminates without conducting any operation. If the operating time T2 exceeds the predetermined time, the operational flow goes to a step S605 to release the in-stop brake from its operation, and the processing comes to an end.

On the other hand, if the answer of the step S601 indicates that the in-stop brake is not in operation, or if the answer of the step S602 shows that the hand brake is not in operation, the operational flow proceeds from the step S601 or the step S602 to a step S606 to set the in-stop brake operating time T2 at zero, and the processing terminates.

Tenth Embodiment

Figure 14:
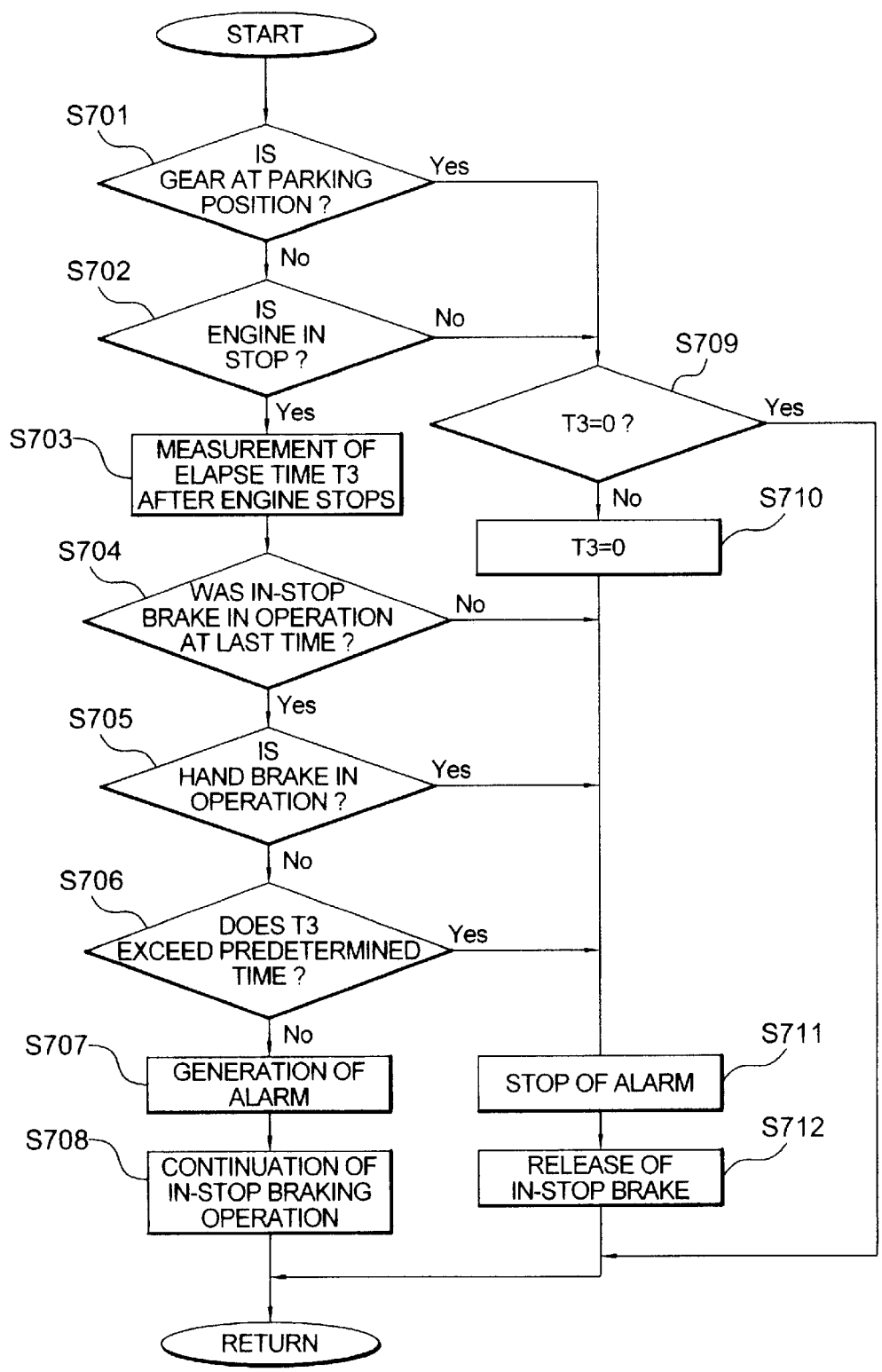
FIG. 14 is a flow chart showing an operation of an in-stop brake system according to a tenth embodiment of this invention.

FIG. 14 is a flow chart showing an operation of an in-stop brake system according to a tenth embodiment of this invention. The operation of the tenth embodiment will be described hereinbelow with reference to the flow chart of FIG. 14. The operation of FIG. 14 is continued from the flow chart of FIG. 2.

First, a step S701 is executed to decide whether or not a gear position of a transmission is the parking. The detection of the gear position is made by the control unit 10A on the basis of the output signal of the gear position detecting means 25 for detecting the gear position as shown in FIG. 3.

If the decision of the step S701 shows that the gear position of the transmission is not the parking, a step S702 follows to decide whether or not the engine is in stop. If the engine is in stop, a step S703 follows to measure an elapse time T3 after the engine stops, then followed by a step S704.

The step S704 is for deciding whether or not the in-stop brake was in operation at the last time. If the in-stop brake was in operation, the operational flow goes to a step S705.

In the step S705, a decision is made on whether the hand brake is in operation. If the hand brake is not in operation, the operational flow advances to a step S706.

In the step S706, a decision is made on whether or not the elapse time T3 after the engine stops exceeds a predetermined time. If the elapse time T3 does not exceed the predetermined time, a step S707 follows to give the alarm, then followed by a step S708 to continue the in-stop braking operation, and the processing terminates.

On the other hand, if the decision of the step S701 shows that the gear position of the transmission is the parking or if the decision of the step S702 indicates that the engine is not in stop, the operational flow advances to a step S709 to decide whether or not the elapse time T3 is at zero. If the elapse time T3 is at zero, since the engine is not in stop, the processing terminates without conducting any operation.

If the decision of the step S709 indicates that T3 is not at zero, a step S710 follows to set the elapse time T3 at zero, then followed by a step S711.

The step S711 is executed to stop the alarm, and a step S712 is then executed to release the in-stop brake from its operating condition, and the processing comes to an end.

Incidentally, in the case that the in-stop brake is not in operation when the engine stops (NO decision in the step S704), if the hand brake is in operation when the engine stops (YES decision in the step S705), or if the elapse time T3 exceeds the predetermined time (YES decision in the step S706), the operational flow also goes to the step S711 to stop the alarm, then followed by the step S712 to release the in-stop brake from its operation, and the processing comes to an end.

Eleventh Embodiment

Figure 15:
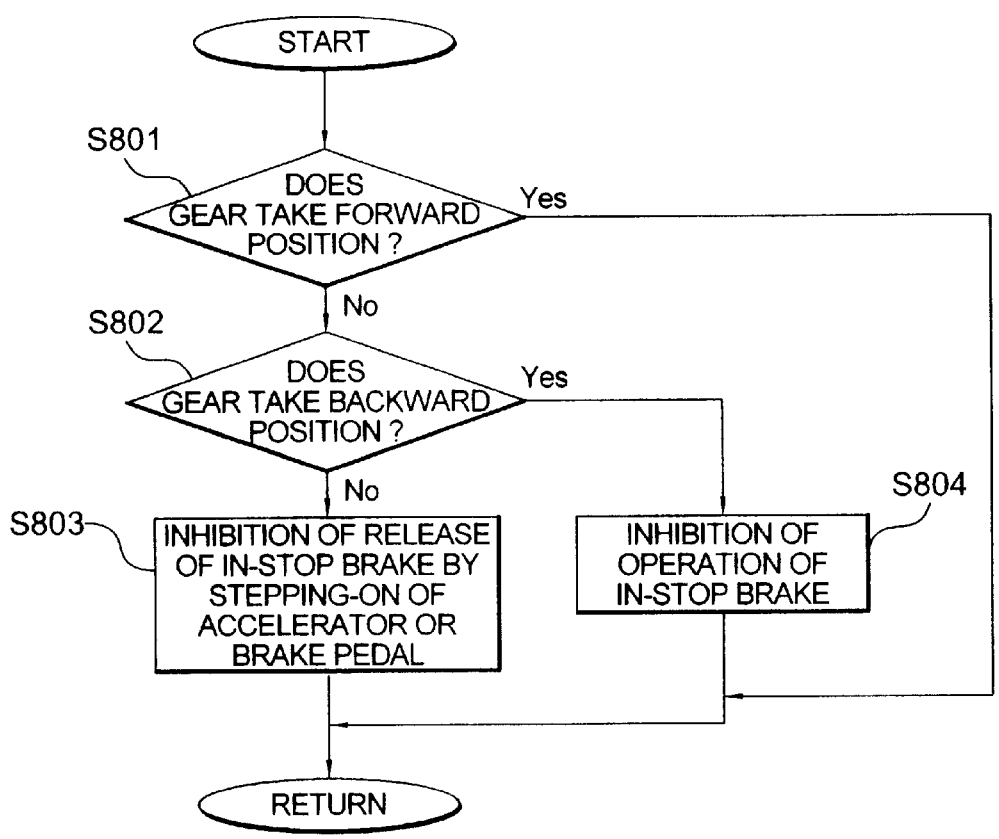
FIG. 15 is a flow chart showing an operation of an in-stop brake system according to an eleventh embodiment of this invention.

FIG. 15 is a flow chart showing an operation of an in-stop brake system according to an eleventh embodiment of this invention. The operation of the eleventh embodiment will be described hereinbelow with reference to the flow chart of FIG. 15.

First, in a step S801, a decision is made on whether or not the gear position of the transmission is the forward position. If the gear position is the forward position, the processing terminates without conducting any operation. If the gear position is not the forward position, the operational flow goes to a step S802.

In the step S802, a decision is made on whether or not the gear position of the transmission is the reverse or reverse or backward position. If the gear position is the backward position, the operational flow advances to a step S804 to inhibit the in-stop braking operation, and the processing comes to an end. On the other hand, the gear position is not the backward position, a decision is made to that the gear position is the parking position or the neutral position, and operational flow proceeds to a step S803.

The step S803 is executed to inhibit the removal of the in-stop braking by stepping on the accelerator or the brake pedal, and the processing comes to an end.

Incidentally, the operation shown in FIG. 15 comes before the decision on the in-stop braking operation/removal in the flow chart of FIG. 2. That is, the operation shown in FIG. 15 is conducted before the step S104 in FIG. 2.

Twelfth Embodiment

Figure 16:
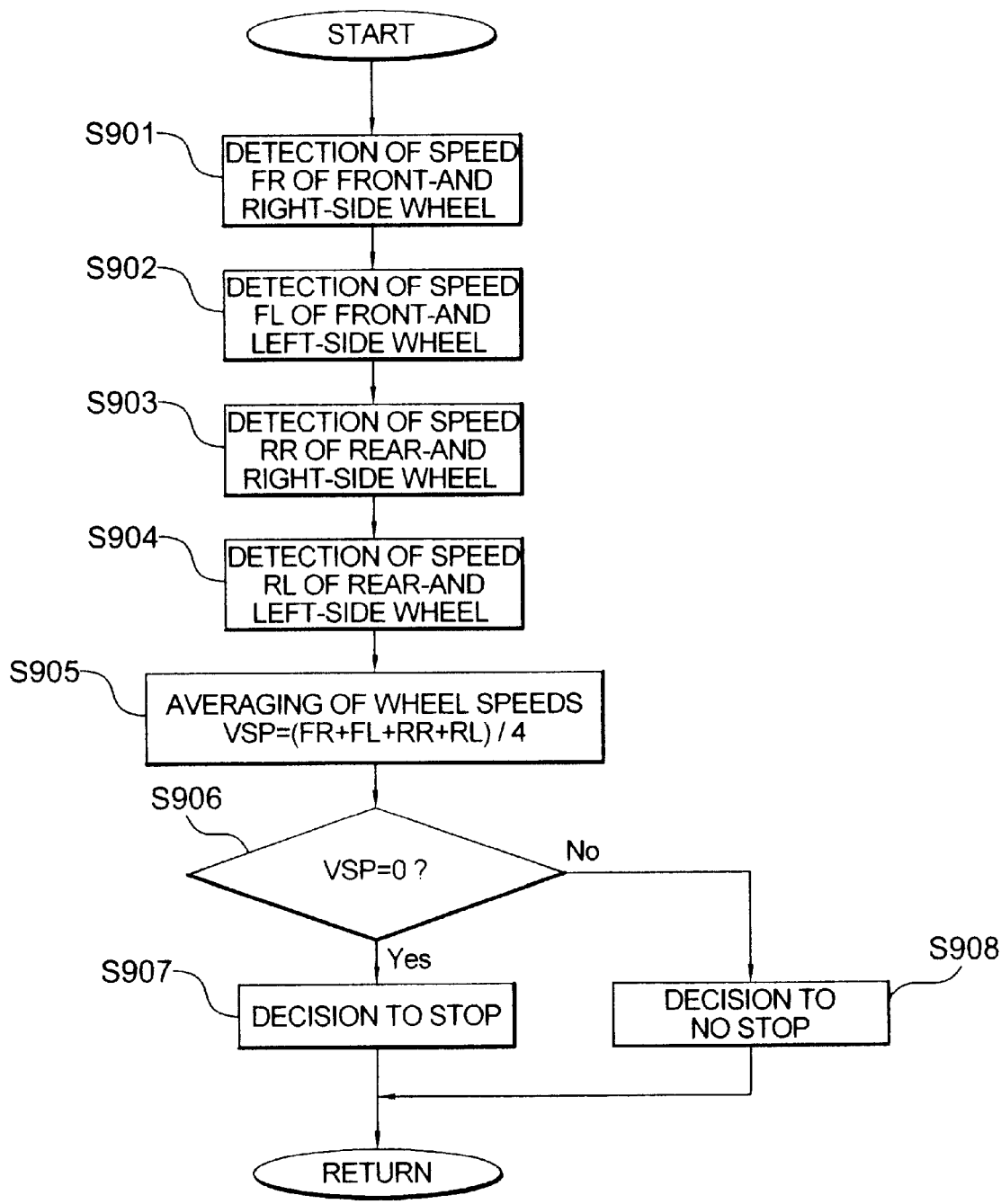
FIG. 16 is a flow chart showing an operation of an in-stop brake system according to a twelfth embodiment of this invention.

FIG. 16 is a flow chart showing an operation of an in-stop brake system according to a twelfth embodiment of this invention. The operation of the twelfth embodiment will be described hereinbelow with reference to the flow chart of FIG. 16.

First, a step S901 is executed to detect the wheel speed FR of the front- and right-side wheel, then followed by a step S902 to detect the wheel speed FL of the front-and left-side wheel. Further, a step S903 is executed to detect the wheel speed RR of the rear- and right-side wheel, the followed by a step S904 to detect the wheel speed RL of the rear- and left-side wheel.

Then, the operational flow advances to a step S905 to average the four wheel speeds FR, FL, RR and RL to obtain a vehicle speed VSP=(FR+FL+RR+RL)/4.

Subsequently, the operational flow advances to a step S906 to decide whether or not the vehicle speed VSP obtained by averaging the four wheel speeds is at zero. If VSP=0, a step S907 follows to makes a decision to that the motor vehicle is in stop. On the other hand, if VSP≠0, a step S908 follows to make a decision to that the motor vehicle is not in stop. These operations are done by the stop detecting means 4.

For make sure the stop decision, the decision to the stop is made when the condition of VSP=0 continues for a predetermined period of time.

Thirteenth Embodiment

Figure 17:
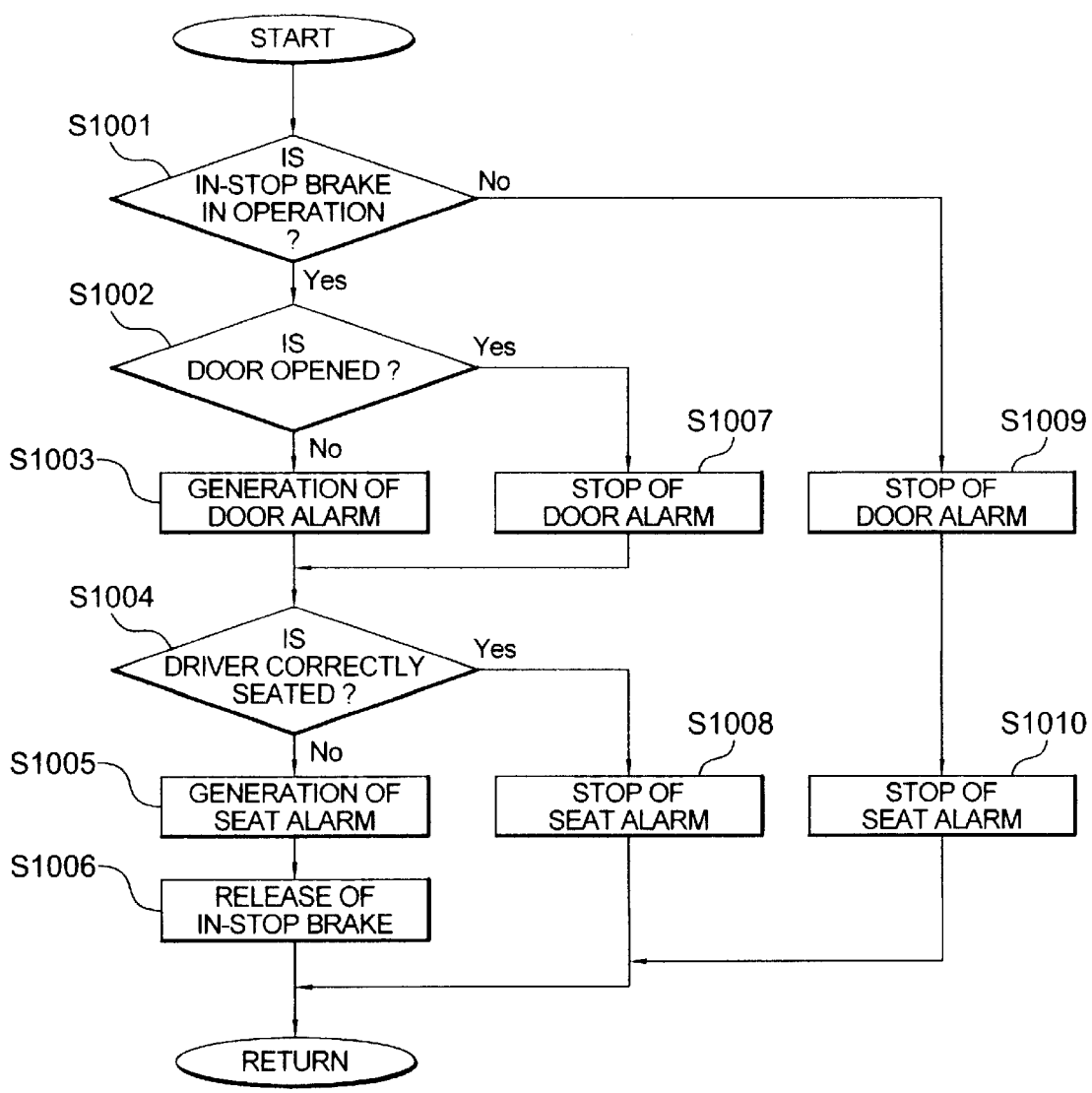
FIG. 17 is a flow chart showing an operation of an in-stop brake system according to a thirteenth embodiment of this invention.

FIG. 17 is a flow chart showing an operation of an in-stop brake system according to a thirteenth embodiment of this invention. The operation of the thirteenth embodiment will be described hereinbelow with reference to the flow chart of FIG. 17.

First, a step S1001 is done to decide whether or not the in-stop brake is in operation. If the in-stop brake is not in operation, a step S1009 follows to stop the door alarm, then followed by a step S1010 to stop the seat alarm, and the processing comes to an end.

On the other hand, the decision of the step S1001 shows that the in-stop brake is in operation, the operational flow advances to a step S1002 to decide whether the door is in the open condition or in the closed condition. If the door is in the open condition, the operational flow proceeds to a step S1003 to give the door alarm. If the door is in the closed condition, the operational flow goes to a step S1007 to stop the door alarm.

Then, a step S1004 follows to detect the seating condition of the driver. If a decision is made to that the Hdriver is not correctly seated, the operational flow goes to a step S1005 to give the seat alarm, and further goes to a step S1006 to release the in-stop brake from its operation, and the processing comes to an end. If the decision of the step S1004 shows that the driver is correctly seated, the operational flow advances to a step S1008 to stop the seat alarm, and the processing comes to an end.

As the seating detecting means 26 in FIG. 3, it is possible to take a method of detecting whether the driver is seated or not through the use of a pressure sensor embedded in the driver's seat or a method of detecting an operating condition of a seat belt.

Fourteenth Embodiment

Figure 18:
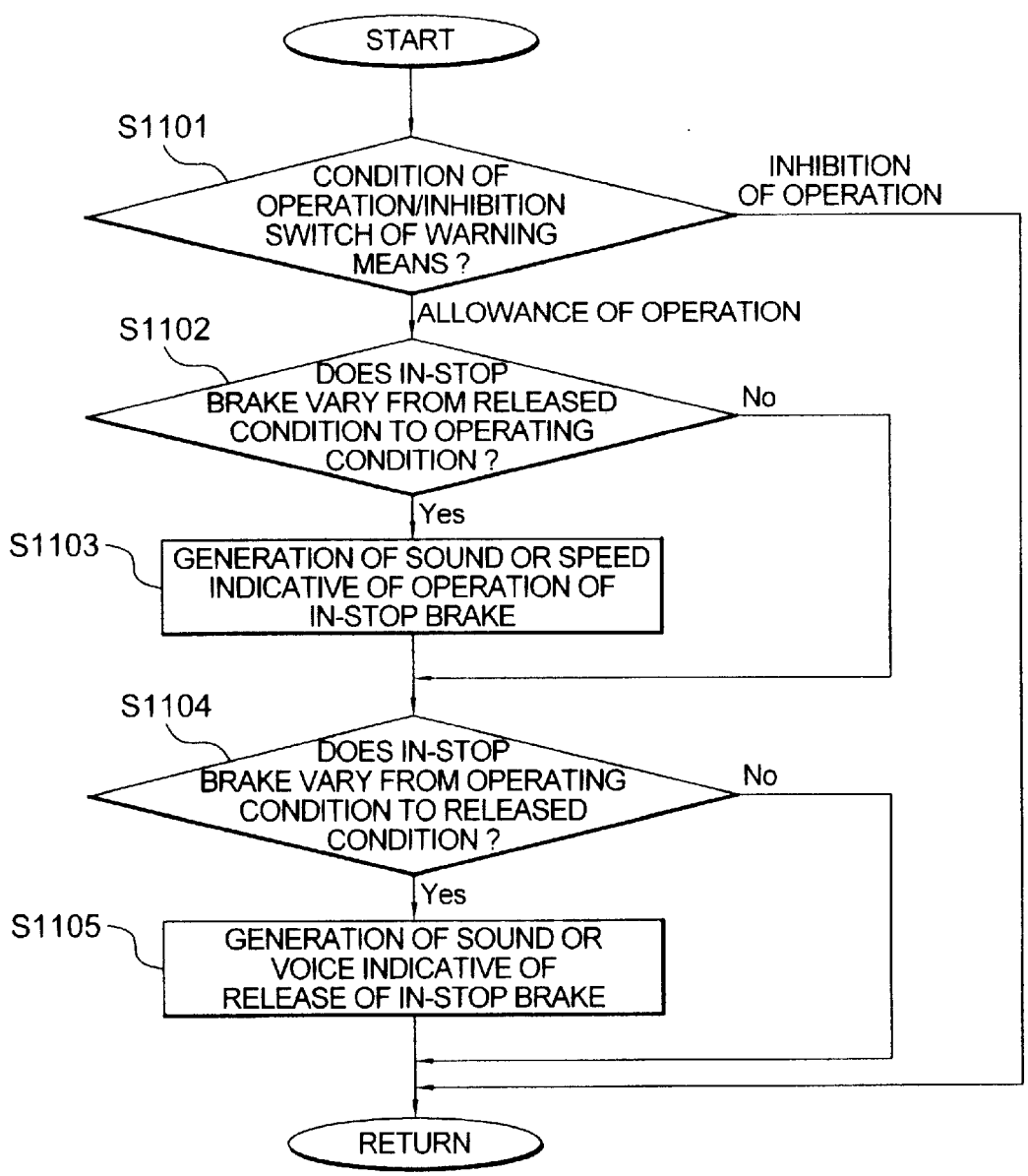
FIG. 18 is a flow chart showing an operation of an in-stop brake system according to a fourteenth embodiment of this invention.

FIG. 18 is a flow chart useful for describing an operation of an in-stop brake system according to a fourteenth embodiment of this invention. The operation of the fourteenth embodiment will be described hereinbelow with reference to the flow chart of FIG. 18.

The operation begins at a step S1101 to decide the state of a switch for determining the allowance/inhibition of voice generation by the warning means 14 shown in FIG. 3. When the driver sets the switch of the warning means 14 to the operation inhibition, the processing terminates without conducting any operation. That is, a sound or a speech is not generated irrespective of the operation/removal of the in-stop braking.

Furthermore, if the decision of the step S1101 indicates that the switch of the warning means 14 is in the operation allowable condition, the operational flow advances to a step S1102.

The step S1102 is for deciding whether or not the in-stop brake now varies from the released condition to the operating condition. Only when a decision is made to that the in-stop brake varies from the released condition to the operating condition, the operational flow advances to a step S1103 to generate a sound or speed indicative of the operation of the in-stop brake.

Subsequently, the operational flow goes to a step S1104 to decide whether or not the in-stop brake now varies from the operating condition to the released condition. Only when a decision is made to that the in-stop brake varies from the operating condition to the released condition, the operational flow proceeds to a step S1105 to generate a sound or a speed representative of the cancellation of the in-stop braking, and the processing comes to an end.

Fifteenth Embodiment

FIGS. 19A to 19D show an operation of the warning means 14 which lights stepwise in accordance with the magnitude of the braking force the driver provides when the motor vehicle is in stop, and in the illustrations, the warning means 14 is made up of six lamps.

In the case that the driver does not step on the brake pedal when the motor vehicle is in stop, as shown in FIG. 19A, all the lamps go off.

In this state, when the driver steps on the brake pedal, the lamps successively go on from the lamp 1 in accordance with the magnitude of the resulting braking force.

For instance, when the brake pedal is stopped on by a force corresponding to 10% of the braking force needed for the in-stop braking operation, only the lamp 1 turns on, and when being stepped on by a force corresponding to 30% of the braking force needed therefor, the lamps 1 and 1 turn on, and further, when being stepped on by a force corresponding to 50% thereof, as shown in FIG. 19B, the lamps 1 to 3 turn on, and still further, when being stepped on by a force corresponding to 70% thereof, the lamps 1 to 4 go on, and moreover, when being stepped on by a force corresponding to 90% thereof, as shown in FIG. 19C, the lamps 1 to 5 go on.

Furthermore, when the braking force due to the stepping-on by the driver reaches the braking force needed for the in-stop braking operation, as shown in FIG. 19D, all the lamps 1 to 6 go on to inform the driver of the in-stop braking operation.

Sixteenth Embodiment

Figure 20A:
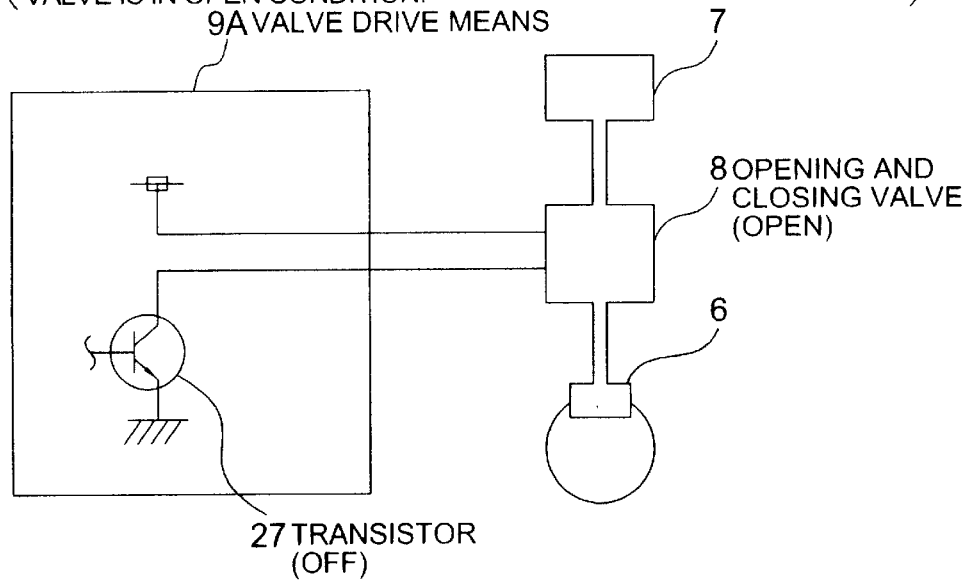
FIGS. 20A and 20B are a structural example of a prior valve drive means and a structural example of an opening and closing valve, respectively, showing different operating conditions.
Figure 20B:
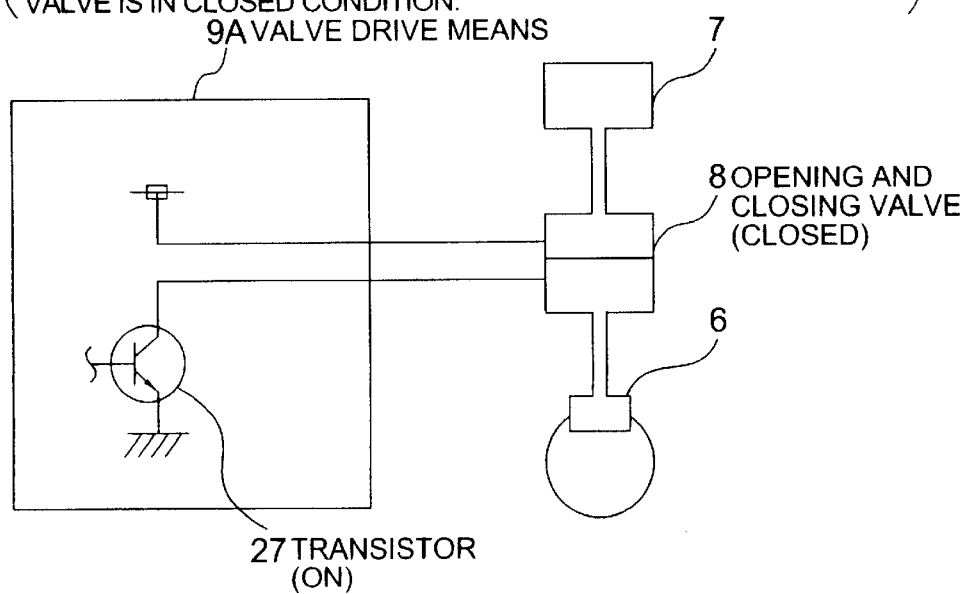

FIGS. 20A and 20B show the relationship among a prior valve drive means 9A (a transistor 27 for actually controlling the valve), an opening and closing valve 8, a wheel cylinder 6 and a master cylinder 7.

FIG. 20A illustrates a state where the in-stop braking is in the released (removed) condition. In this state, since the transistor 27 of the valve drive means 9A takes the OFF state, the opening and closing valve 8 assumes the open condition to establish the communication through the brake fluid passage between the wheel cylinder 6 and the master cylinder 7. Further, FIG. 20B shows a state where the in-stop brake is in operation. In this state, since the transistor 27 takes the ON state, the opening and closing valve 8 assumes the closed condition so that the brake fluid passage between the wheel cylinder 6 and the master cylinder 7 is cut off at the position of the opening and closing valve 8.

Figure 21A:
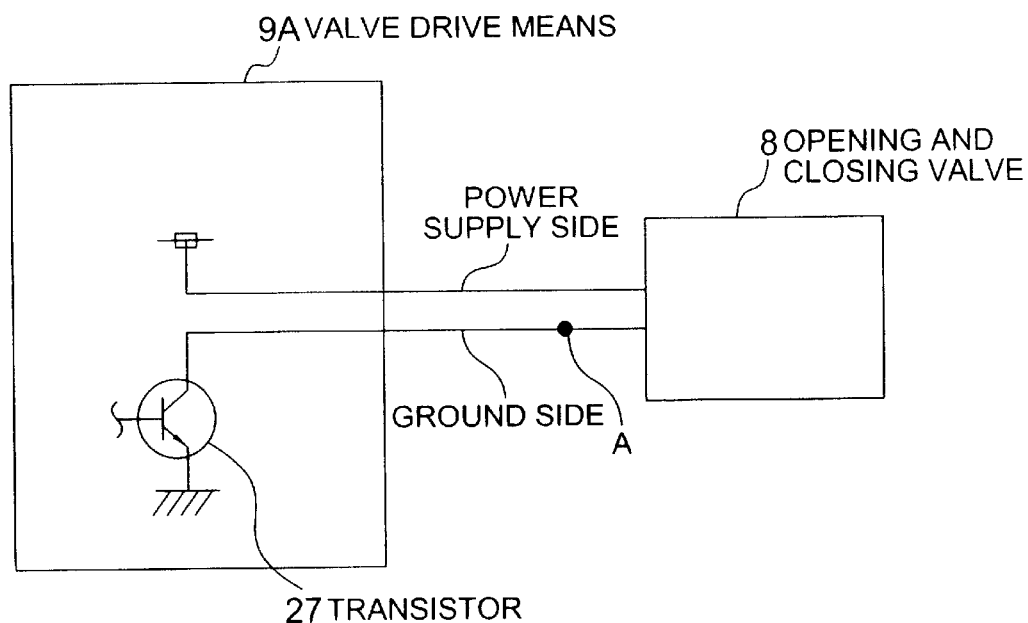
FIG. 21A is an illustration for describing operations of the prior valve drive means and opening and closing valve.

FIG. 21A illustrates an operation of the prior valve drive means 9A. In the case of the above-mentioned construction, since the transistor 27 of the valve drive means 9A is connected to only the ground side of the opening and closing valve 8, for example, if a grounding trouble occurs at a point A in FIG. 21A, the control difficulty occurs in a state where the opening and closing valve 8 is energized (the valve is closed).

Figure 21B:
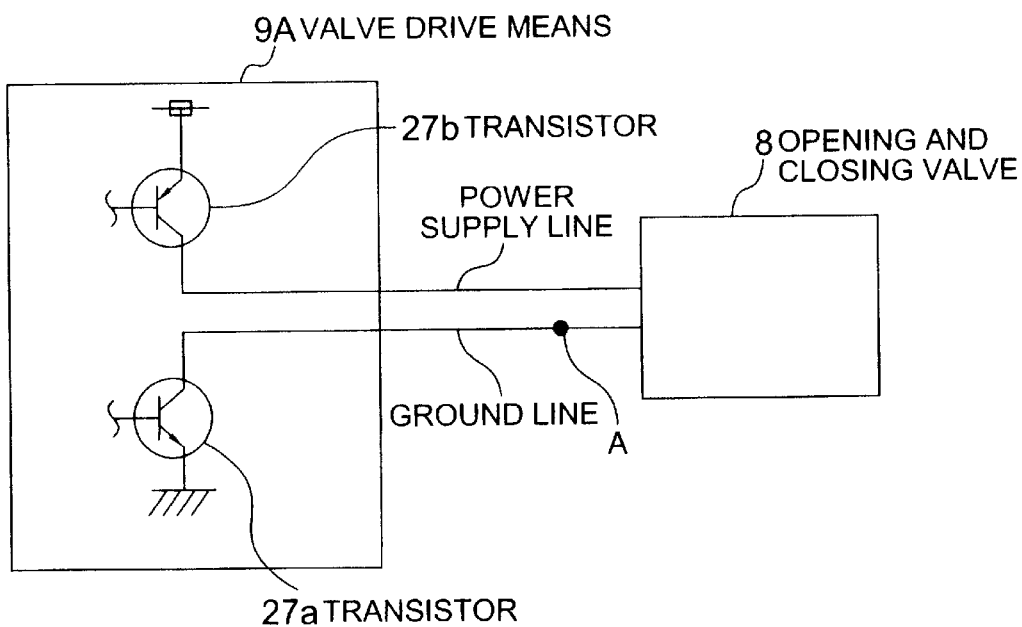
FIG. 21B is an illustration for describing operations of a valve drive means and opening and closing valve according to sixteenth embodiment of this invention.

Thus, in this invention, as shown in FIG. 21B, in addition to an opening and closing valve 8 ground side transistor 27a, a transistor 27b is further connected to the power supply side of the opening and closing valve 8. In consequence, even if a grounding trouble occurs at a point A in the illustration, the closing control of the opening and closing valve 8 becomes possible in a manner of turning off the transistor 27b.

Figure 22A:
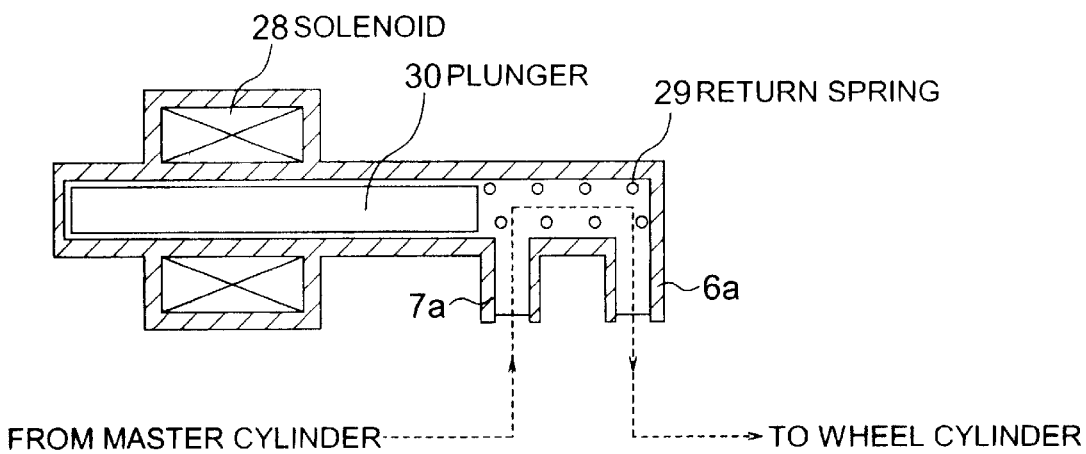
FIGS. 22A and 22B are cross-sectional views showing an example of opening and closing valve according to this invention, showing different operating conditions.
Figure 22B:
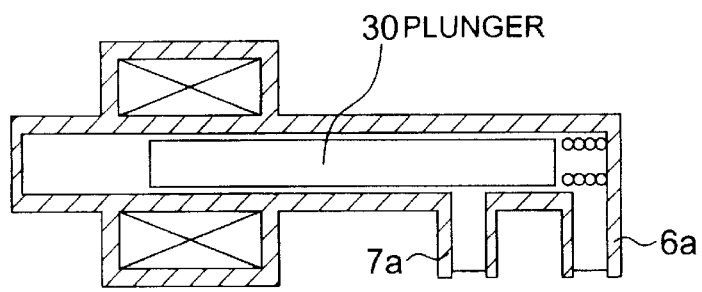

FIGS. 22A and 22B show a construction of the opening and closing valve 8, and, of these illustrations, FIG. 22A shows a state in which the in-stop brake is in the released condition from its operation (the valve is in the open condition). In this state, since a solenoid 28 is deenergized, a plunger 30 is pressed toward the left end due to the force of a return spring 29, and the opening and closing valve 8 makes a communication between the wheel cylinder 6 and the master cylinder 7 (the valve is opened).

FIG. 22B shows a state in which the in-stop brake is in operation (the valve is closed). In this state, the solenoid 28 is energized and the plunger 30 is pressed to the right end because of overcoming the force of the return spring 29 so that the opening and closing valve 8 cuts off the brake fluid passage between the wheel cylinder 6 and the master cylinder 7 (the valve is closed). With this construction, in accordance with the right-hand movement of the plunger 30, a brake fluid passage 7a going from master cylinder 7 to the opening and closing valve 8 is first cut off, and subsequently, the brake fluid within the opening and closing valve 8 is pressed and moved in the direction that the volume of a wheel cylinder 6 side brake fluid passage 6a decreases, and the further right-hand movement of the plunger 30 pressurizes the wheel cylinder 6.

Figure 23:
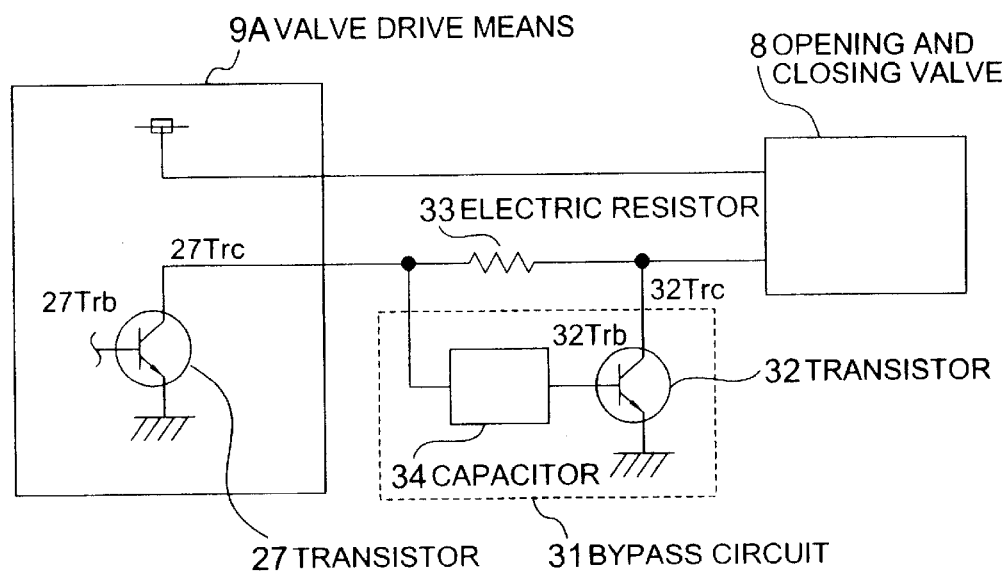
FIG. 23, is an illustration of an arrangement of a bypass circuit according to this invention.
Figure 24:
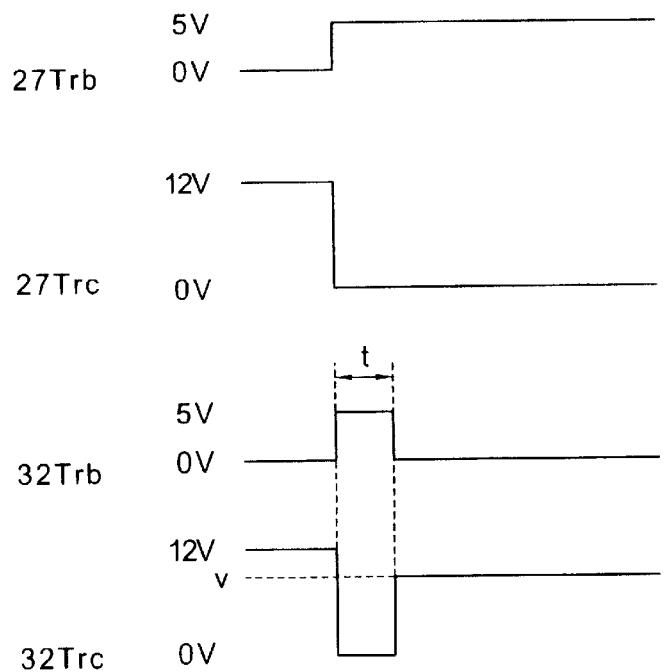
FIG. 24 is a time chart showing an operation of the bypass circuit according to this invention.

Furthermore, FIGS. 23 and 24 illustrate an arrangement and operation of the bypass circuit 31. As shown in FIG. 23, this bypass circuit 31 is composed of a series circuit comprising a transistor 32 and capacitor 34 coupled in parallel to and across an electric resistor 33 inserted into an electric line connecting the transistor 27 of the valve drive means 9 with the opening and closing valve 8.

When the energization of the opening and closing valve 8 starts, the transistor 27 of the transistor 27 of the valve drive means 9 first turns ON and at the same time the bypass circuit 31 operates so that the transistor 32 of the bypass circuit 31 turns ON for a predetermined time t. In consequence, the energizing current for the opening and closing valve 8 flows through the transistor 32.

After the elapse of the predetermined time t, the in bypass circuit 31 stops so that the transistor 32 turns OFF. As a result, the energizing current for the opening and closing valve 8 passes through the electric resistor 33 and further passes through the transistor 27, so that the energizing current for the opening and closing valve 8 decreases while the in-stop brake is in operation, thereby suppressing the rise of the temperature.

The above-mentioned operation will additionally be described with reference to the time chart of FIG. 24. When the voltage of the base 27Trb of the transistor 27 varies from 0V to 5V, the transistor 27 turns ON, and the voltage of the collector 27Trc of the transistor 27 varies from 12V (battery voltage) to 0V. At the same time, the bypass circuit 31 operates, and the voltage of the base 32Trb of the transistor 32 varies from 0V to 5V, so that the transistor 32 turns ON, and the voltage of the collector 32Trc of the transistor 32 varies from 12V to 0V. In consequence, the energizing current for the opening and closing valve 8 flows through the transistor 32.

Furthermore, after the elapse of the predetermined time t, the bypass circuit 31 stops, and the voltage of the base 32Trb of the transistor 32 returns from 5V to 0V so that the transistor 32 turns OFF. For this reason, the energizing current for the opening and closing valve 8 flows through the electric resistor 33 and further passes through the transistor 27.

Since the current for the opening and closing valve 8 flows along this path afterwards, the energization continues in a state where the energizing current is decreased through the electric resistor 33.

In the case that the battery voltage goes down like the engine is starting, the energizing current further reduces, and hence, there is a possibility that the force for holding the closed opening and closing valve 8 becomes insufficient. For this reason, in a manner that the battery voltage is detected and the bypass circuit 31 is operated when the battery voltage goes down to increase the energizing current, the force for holding the condition of the opening and closing valve 8 is maintainable.

According to this invention, the in-stop brake system immediately operates if the braking force generated due to the stepping-on of the brake pedal by the driver at the stop of the motor vehicle exceeds a predetermined braking force, and a necessary and sufficient in-stop braking force is always obtainable, thus providing an in-stop brake system which is very effective along with being easy to use.

Furthermore, unlike the prior art, it is possible to remove the problems in waiting for a given period of time until the in-stop brake operates.

Still further, irrespective of the variation of the road grade, it is possible to operate the in-stop brake in a state where the driver surely provides the braking force necessary for the stop.

Still further, irrespective of the variation of the warming-up condition of the engine, it is possible to operate the in-stop brake in a state where the driver surely provides the braking force necessary for the stop.

Still further, irrespective of the presence or absence of the grade detecting means or the warming-up detecting means, it is possible to operate the in-stop brake in a state where the driver always surely provides the braking force necessary for the stop.

Still further, in the case that the movement of the motor vehicle is detected although the in-stop brake is in operation, the set valve is adjusted to a larger value. Thus, the re-occurrence of such a situation or event is preventable. In addition, such the situation is immediately communicated to the driver so that the driver steps on the brake pedal. Further, after the driver recognizes such the situation, it is possible to stop the alarm offensive to the ear. The re-occurrence of such the situation is automatically preventable afterwards.

Moreover, since the in-stop brake can also be released from its operation by the brake operation and the switching to the stepping-on of the accelerator is unnecessary when the motor vehicle is started in a state where the brake is operated, the operational performance is improvable. In addition, since the in-stop braking is removed in a state where no difference in pressure between a wheel cylinder and a master cylinder exists, the smooth switching to the brake under control of the driver becomes feasible.

Besides, even while the motor vehicle stops due to the in-stop braking, it is possible to inform the following motor vehicles of that stop. In addition, the detection of the trouble of the brake lamp or the stop lamp is possible.

Even if the engine is stopped with the hand brake being not operated, the motor vehicle does not rapidly start, and it is possible to inform the driver of the necessity of the stepping-on of the brake pedal or the operation of the hand brake.

For instance, even while the engine is in stop due to the turning-off of the key switch, the operation of the in-stop brake and the alarm can be terminated without conducting a particular operation.

When the gear of the transmission takes the parking position, it is possible to avoid the unnecessary in-stop braking operation or the generation of the alarm offensive to the ear.

Besides, it is possible to prevent the useless consumption of current. In addition, the opening and closing valve is openable even if the control signal on the ground side of the opening and closing valve is grounded.

The pressurization to the wheel cylinder is made when the opening and closing valve is closed, and hence, the braking force the driver is required to provide for operating the in-stop brake is reducible. In addition, it is possible to further enhance the braking force obtained by the stepping-on of the brake pedal by the driver.

Furthermore, it is possible to suppress the rise of the temperature of the opening and closing valve while the in-stop brake is in operation. In addition, in the case that the battery voltage goes down like when the engine is starting, it is possible to suppress the decrease in the holding current to be supplied to the opening and closing valve.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An in-stop brake system comprising:

stop detecting means for detecting a stop condition of a motor vehicle;

accelerator detecting means for detecting an operating quantity of an accelerator pedal;

brake detecting means for detecting an operating quantity of a brake pedal or a braking force varying in accordance with the operating quantity of said brake pedal;

valve means provided on a brake fluid passage between a wheel cylinder and a master cylinder for closing or opening thereof;

a control unit for controlling an operation of an in-stop brake and an opening and closing operation of said valve means on the basis of outputs of said stop detecting means, said accelerator detecting means and said brake detecting means;

said control unit comprising;
operation decision means for allowing said in-stop brake to operate when a braking force generated upon a driver stepping on said brake pedal exceeds a predetermined braking force under the conditions that said motor vehicle is in a stopped condition and that said accelerator pedal is in a released condition, said operation decision means being further operable to inhibit said in-stop brake from being operated when said accelerator pedal is stepped on; and valve drive means for closing said valve means when said operation decision means allows the operation of said in-stop brake, and further for opening said valve means when said operation decision means inhibits the operation of said in-stop brake; and grade detecting means for directly or indirectly detecting an inclination between front and rear portions of said motor vehicle as a road grade, wherein said control unit receives an output of said grade detecting means so that it changes the value of said predetermined braking force without regard to the force being applied to said brake pedal and in accordance with the detected road grade, which is one of said in-stop brake operation conditions.

2. An in-stop brake system as defined in claim 1, wherein said control unit releases said in-stop brake from its operating condition when said brake pedal is once released or substantially released from its operating condition after said in-stop brake has been put into operation and subsequently said brake pedal is again stepped on to generate said predetermined braking force.

3. An in-stop brake system as defined in claim 1, wherein said control unit makes a stop lamp go on while said in-stop brake is in operation even if said brake pedal is in a released condition.

4. An in-stop brake system as defined in claim 1, further comprising engine detecting means for detecting whether said engine is stopped or not, wherein said control unit receives an output of said engine detection means so that it inhibits said in-stop brake from being operated during stoppage of said engine.

5. An in-stop brake system as defined in claim 1, further comprising a switch through which a driver is able to make a selection such that said in-stop brake is permitted or inhibited to operate.

6. An in-stop brake system as defined in claim 1, further comprising:
engine detecting means for detecting whether an engine of said motor vehicle is stopped or not;
hand brake detecting means for detecting an operating condition of a hand brake; and
warning means for generating a warning;
wherein said control unit receives outputs of said engine detecting means and said hand brake detecting means so that it makes the operation of said in-stop brake continue only for a predetermined period of time and said warning means to give a warning even if said engine is stopped during the time when said in-stop brake is in operation and said hand brake is out of operation to give a driver the chance to apply said hand brake while the vehicle is stopped.

7. An in-stop brake system as defined in claim 6, wherein the operations of said in-stop brake and said warning means, which are continued for said predetermined period of time even if said engine is stopped during the time when said in-stop brake is in operation and said hand brake is out of operation, are stopped at least by a driver stepping on said brake pedal or operating said hand brake.

8. An in-stop brake system as defined in claim 6, further comprising gear position detecting means for detecting a gear position of a transmission, wherein said control unit receives an output of said gear position detecting means so that it precludes, when the gear position of said transmission assumes a parking position, said in-stop brake and said warning means from being continuously operated for said predetermined period of time even upon said engine being stopped during the operation of said in-stop brake and the non-operation of said hand brake.

9. An in-stop brake system as defined in claim 6, wherein said valve means is energized into a closed condition by a control signal and de-energized into an opened condition in the absence of said control signal.

10. An in-stop brake system as defined in claim 1, further comprising gear position detecting means for detecting a gear position of a transmission, wherein said control unit receives an output of said gear position sensing means so that it inhibits said in-stop brake from being released upon a driver stepping on an accelerator pedal or a brake pedal when said transmission is not operably coupled with said engine.

11. An in-stop brake system as defined in claim 1, further comprising gear position detecting means for detecting a gear position of a transmission, wherein said control unit receives an output of said gear position detecting means so that it inhibits said in-stop brake from being operated when the gear position of said transmission is at a reverse position.

12. An in-stop brake system as defined in claim 1, further comprising:
door detecting means for detecting an opened/closed condition of a door of at least a driver's seat; and
warning means for generating a warning when said in-stop brake is in operation and when said door is opened.

13. An in-stop brake system comprising:
stop detecting means for detecting a stop condition of a motor vehicle;
accelerator detecting means for detecting an operating quantity of an accelerator pedal;
brake detecting means for detecting an operating quantity of a brake pedal or a braking force varying in accordance with the operating quantity of said brake pedal;
valve means provided on a brake fluid passage between a wheel cylinder and a master cylinder for closing or opening thereof; and
a control unit for controlling an operation of an in-stop brake and an opening and closing operation of said valve means on the basis of outputs of said stop detecting means, said accelerator detecting means and said brake detecting means;
said control unit comprising;
operation decision means for allowing said in-stop brake to operate when a braking force generated upon a driver stepping on said brake pedal exceeds a predetermined braking force under the conditions that said motor vehicle is in a stopped condition and that said accelerator pedal is in a released condition, said operation decision means being further operable to inhibit said in-stop brake from being operated when said accelerator pedal is stepped on;

valve drive means for closing said valve means when said operation decision means allows the operation of said in-stop brake, and further for opening said valve means when said operation decision means inhibits the operation of said in-stop brake; and warning means for informing a motor vehicle driver of a control condition of said in-stop brake, wherein said control unit makes said warning means give a warning when a movement of said motor vehicle is detected in spite of said in-stop brake being in operation.

14. An in-stop brake system as defined in claim 13, wherein said warning, which is given by said warning means when a movement of said motor vehicle is detected in spite of said in-stop brake being in operation, is stopped through at least a brake operation by the driver.

15. An in-stop brake system comprising:

stop detecting means for detecting a stop condition of a motor vehicle;

accelerator detecting means for detecting an operating quantity of an accelerator pedal;

brake detecting means for detecting an operating quantity of a brake pedal or a braking force varying in accordance with the operating quantity of said brake pedal;

valve means provided on a brake fluid passage between a wheel cylinder and a master cylinder for closing or opening thereof; and a control unit for controlling an operation of an in-stop brake and an opening and closing operation of said valve means on the basis of outputs of said stop detecting means, said accelerator detecting means and said brake detecting means;

said control unit comprising;

operation decision means for allowing said in-stop brake to operate when a braking force generated upon a driver stepping on said brake pedal exceeds a predetermined braking force under the conditions that said motor vehicle is in a stopped condition and that said accelerator pedal is in a released condition, said operation decision means being further operable to inhibit said in-stop brake from being operated when said accelerator pedal is stepped on;

valve drive means for closing said valve means when said operation decision means allows the operation of said in-stop brake, and further for opening said valve means when said operation decision means inhibits the operation of said in-stop brake; and engine detecting means for detecting whether an engine of said motor vehicle is stopped or not;

hand brake detecting means for detecting an operating condition of a hand brake; and warning means for generating a warning;

wherein said control unit receives outputs of said engine detecting means and said hand brake detecting means so that it makes the operation of said in-stop brake continue only for a predetermined period of time and said warning means to give a warning even if said engine is stopped during the time when said in-stop brake is in operation and said hand brake is out of operation; and a bypass circuit connected in parallel to an electric resistor on an electric line between said valve means and said valve drive means, wherein said valve means is energized through said bypass circuit at an initial energization time, and after said valve means is placed into a closed condition, the energization by said bypass circuit is stopped and energization of said valve means is accomplished through said electric resistor disposed in parallel to said bypass circuit.

16. An in-stop brake system as defined in claim 15, wherein, when a voltage of a battery for supplying power to said valve means goes down, the energization of the valve means by said bypass circuit is maintained while the energization of the valve means made through said electric resistor disposed in parallel to said bypass circuit is inhibited.

17. An in-stop brake system comprising:

stop detecting means for detecting a stop condition of a motor vehicle;

accelerator detecting means for detecting an operating quantity of an accelerator pedal;

brake detecting means for detecting an operating quantity of a brake pedal or a braking force varying in accordance with the operating quantity of said brake pedal;

valve means provided on a brake fluid passage between a wheel cylinder and a master cylinder for closing or opening thereof; and a control unit for controlling an operation of an in-stop brake and an opening and closing operation of said valve means on the basis of outputs of said stop detecting means, said accelerator detecting means and said brake detecting means;

said control unit comprising;

operation decision means for allowing said in-stop brake to operate when a braking force generated upon a driver stepping on said brake pedal exceeds a predetermined braking force under the conditions that said motor vehicle is in a stopped condition and that said accelerator pedal is in a released condition, said operation decision means being further operable to inhibit said in-stop brake from being operated when said accelerator pedal is stepped on; and valve drive means for closing said valve means when said operation decision means allows the operation of said in-stop brake, and further for opening said valve means when said operation decision means inhibits the operation of said in-stop brake;

wherein said control unit releases said in-stop brake from its operating condition when said brake pedal is once released or substantially released from its operating condition after said in-stop brake has been put into operation and subsequently said brake pedal is again stepped on to generate said predetermined braking force; and a check valve coupled in parallel to said valve means for allowing only flow of a brake fluid from said master cylinder to said wheel cylinder, wherein, when said brake fluid passed through said check valve upon the driver re-stepping on said brake pedal to cause an increase in a braking force of said wheel cylinder, said control unit makes a decision that said brake is once released or substantially released from its operating condition after said in-stop brake has been put into an operating condition and subsequently said brake pedal is again stepped on to generate said predetermined braking force.

18. An in-stop brake system comprising:

stop detecting means for detecting a stop condition of a motor vehicle;

accelerator detecting means for detecting an operating quantity of an accelerator pedal;

brake detecting means for detecting an operating quantity of a brake pedal or a braking force varying in accordance with the operating quantity of said brake pedal;

valve means provided on a brake fluid passage between a wheel cylinder and a master cylinder for closing or opening thereof; and a control unit for controlling an operation of an in-stop brake and an opening and closing operation of said valve means on the basis of outputs of said stop detecting means, said accelerator detecting means and said brake detecting means;

said control unit comprising;

operation decision means for allowing said in-stop brake to operate when a braking force generated upon a driver stepping on said brake pedal exceeds a predetermined braking force under the conditions that said motor vehicle is in a stopped condition and that said accelerator pedal is in a released condition, said operation decision means being further operable to inhibit said in-stop brake from being operated when said accelerator pedal is stepped on;

valve drive means for closing said valve means when said operation decision means allows the operation of said in-stop brake, and further for opening said valve means when said operation decision means inhibits the operation of said in-stop brake; and warming-up detecting means for directly or indirectly detecting a warming-up condition of an engine of said motor vehicle, wherein said control unit receives an output of said warming-up detecting means so that it changes the value of said predetermined braking force without regard to the force being applied to said brake pedal and in accordance with the detected engine warming-up conditions, which is one of said in-stop brake operation conditions.

* * * * *